United States Patent
Sharma et al.

(10) Patent No.: US 12,299,061 B1
(45) Date of Patent: May 13, 2025

(54) INTELLIGENT DATABASE PAGE PREFETCHING FOR FASTER QUERY PROCESSING

(71) Applicant: Amazon Technologies, Inc., Seattle, WA (US)

(72) Inventors: Pratik Sharma, Mumbai (IN); Vamsavardhan Thotakura, Bangalore (IN); Souvik Dhargupta, Konnagar (IN); Vivek Ramnani, Kalol (IN)

(73) Assignee: Amazon Technologies, Inc., Seattle, WA (US)

( * ) Notice: Subject to any disclaimer, the term of this patent is extended or adjusted under 35 U.S.C. 154(b) by 29 days.

(21) Appl. No.: 17/862,003

(22) Filed: Jul. 11, 2022

(51) Int. Cl.
*G06F 16/957* (2019.01)
*G06F 16/901* (2019.01)

(52) U.S. Cl.
CPC ...... *G06F 16/9574* (2019.01); *G06F 16/9024* (2019.01)

(58) Field of Classification Search
CPC ............. G06F 16/9574; G06F 16/9024
USPC .......................................... 707/721
See application file for complete search history.

(56) References Cited

U.S. PATENT DOCUMENTS

| | | | |
|---|---|---|---|
| 9,081,789 B2* | 7/2015 | Anderson | H04L 67/60 |
| 9,122,513 B2* | 9/2015 | Jacob | G06F 9/4881 |
| 10,289,555 B1* | 5/2019 | Michaud | G06F 12/109 |
| 2005/0149634 A1* | 7/2005 | McKenney | G06F 9/52 |
| | | | 709/248 |
| 2009/0319486 A1* | 12/2009 | Surlaker | G06F 16/2329 |
| 2011/0320415 A1* | 12/2011 | Berger | G06F 16/24552 |
| | | | 707/E17.014 |
| 2013/0007016 A1* | 1/2013 | Saxena | G06F 16/9574 |
| | | | 707/748 |
| 2013/0246722 A1* | 9/2013 | Suzuki | G06F 3/0608 |
| | | | 711/E12.091 |
| 2018/0189176 A1* | 7/2018 | Jobi | G06F 9/5022 |
| 2018/0196753 A1* | 7/2018 | Bitincka | G06F 12/0802 |
| 2020/0050604 A1* | 2/2020 | Tung | G06F 16/2425 |
| 2021/0109860 A1* | 4/2021 | Gottin | G06F 12/0862 |

(Continued)

FOREIGN PATENT DOCUMENTS

IN 201642028559 A * 2/2018 ............. G06F 12/00

OTHER PUBLICATIONS

Wook-Shin Han et al., A Formal Framework for Prefetching Based on the Type-Level Access Pattern in Object-Relational DBMSs, 2005, IEEE Transactions On Knowledge and Data Engineering, vol. 17, No. 10, all pages. (Year: 2005).*

*Primary Examiner* — Amy Ng
*Assistant Examiner* — Antonio J Caiado
(74) *Attorney, Agent, or Firm* — Nicholson Devos Webster & Elliott LLP

(57) ABSTRACT

Techniques for intelligent prefetching of database pages for improved query processing are described. Page access patterns for queries are collected over time and used to update a graph data structure to include collections of nodes corresponding to database pages that are often and/or recently accessed together. When processing a query, the graph data structure can be used to identify scenarios when prefetching may be helpful and to identify particular pages that should be prefetched. These pages are prefetched and placed in a local cache storage that can be rapidly accessed by query processors in comparison to the original storage location for this data, which may be across a network.

20 Claims, 11 Drawing Sheets

(56) References Cited

U.S. PATENT DOCUMENTS

2021/0326263 A1* 10/2021 Schulze .............. G06F 12/0862
2022/0114178 A1* 4/2022 Haprian .............. G06F 16/9024
2022/0382743 A1* 12/2022 Budovski .............. G06F 16/215

* cited by examiner

```
PAGE GRAPH REPRESENTATION 300

1->2(50)
2->3(45),6(100)
3->4(45),6(5)
4->5(20)
5->6(20)
6->7(100)
7->8(80)
8->9(80)
9->10(15)
11->6(20)
```

INTELLIGENT DATABASE PAGE PREFETCHING FOR FASTER QUERY PROCESSING

BACKGROUND

In modern cloud services, resilience and scalability can be achieved by decoupling compute from storage and by replicating storage across multiple nodes. This architecture allows cloud services such as database services to be able to handle operations such as replacing misbehaving or unreachable hosts, adding replicas, failing over from a writer to a replica, scaling the size of a database instance up or down, etc.

The input/output (I/O) bottleneck faced by traditional database systems changes in this environment. As I/Os can be spread across many nodes and many disks via use of a multi-tenant fleet, the individual disks and nodes are no longer "hot." Instead, bottlenecks move to the network between the database processing tier requesting the I/Os and the storage tier that performs the I/Os. Accordingly, techniques for improving network delays and related issues in these settings remain very desirable to be able to increase the performance of such databases.

BRIEF DESCRIPTION OF DRAWINGS

Various examples in accordance with the present disclosure will be described with reference to the drawings, in which.

DETAILED DESCRIPTION

The present disclosure relates to methods, apparatus, systems, and non-transitory computer-readable storage media for intelligent database page prefetching. According to some examples, pages of a database can be prefetched from a storage layer and cached, for subsequently faster query processing, based on detected page access patterns of database queries observed over time. In some examples, a database includes a storage layer of one or more page storage nodes that is decoupled from a separate set of database nodes that perform query processing. A database node may include a prefetch engine that maintains a knowledge graph of related page numbers of the database system based on page access patterns for different database queries that are observed and learned over a period of time, which may include the use of machine learning techniques. The knowledge graph can be persisted in a non-volatile storage area that is local to the database node for the sake of database node failure recovery, allowing for rapid reutilization of the graph. The edges of the knowledge graph can include weights that may be updated based on how frequently and/or recently a particular page was accessed after its associated or related page was accessed. In some examples, the weights of these edges are reduced periodically according to a time decay function to delete related sets of page numbers pertaining to old page access patterns. In some examples, a read-copy-update locking mechanism can be utilized to control access to the nodes of the graph by different database query processing threads (and/or a prefetch engine that updates the graph) to thus reduce contention and ensure high performance.

Accordingly, using relatively lightweight structures, overall query processing can be significantly improved—especially in systems with a decoupled processing layer and storage layer—via highly-accurate page prefetching that allows query processing threads to avoid significant periods of waiting for needed data. Moreover, techniques disclosed herein are general in nature and are not limited to working for only particular types of queries, and disclosed techniques can address prefetching issues for a wide range of query types, allowing for the exploitation of data access patterns that other systems cannot catch.

Figure 1:
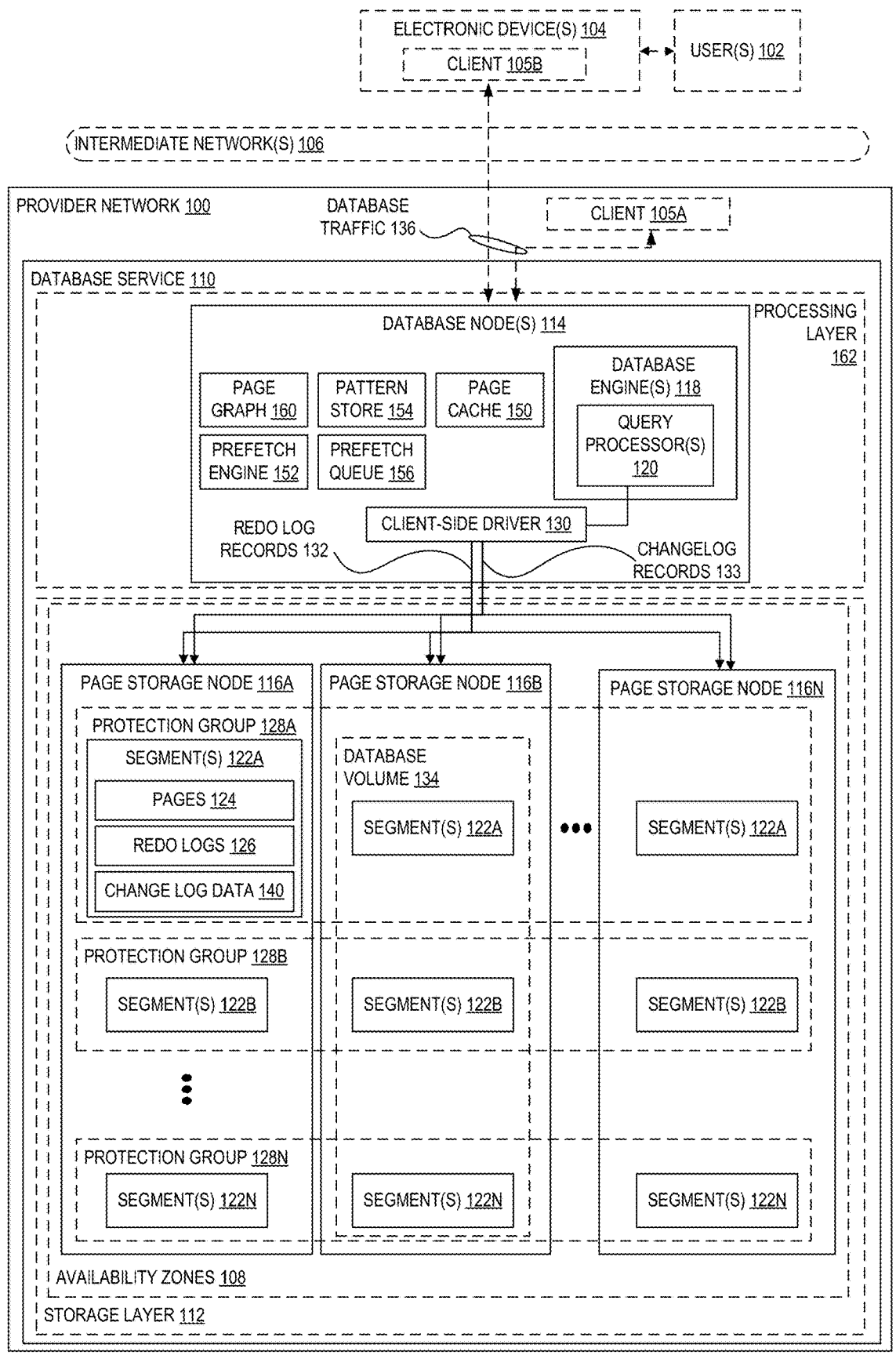
FIG. 1 illustrates an exemplary system including a database service provided by a service provider network utilizing intelligent database page prefetching according to some examples.

FIG. 1 illustrates an exemplary system including a database service 110 provided by a service provider network 100 implementing intelligent database page prefetching according to some examples. A cloud provider network 100 (sometimes referred to simply as a "cloud") refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

Thus, a provider network 100 can provide users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services, such as a hardware virtualization service that can execute compute instances, a storage service that can store data objects, a database service 110 that provides database functionalities, etc. Users 102 (or "customers") of provider networks 100 may utilize one or more user accounts that are associated with a customer account, though these terms may be used somewhat interchangeably depending upon the context of use. Users 102 may use electronic device(s) 104 (e.g., via client 105B software applications) to interact with a provider network 100 across one or more intermediate networks 106 (e.g., the internet) via one or more interface(s), such as through use of application programming interface (API) calls, via a console implemented as a website or application, etc. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. The interface(s) may be part of, or serve as a front-end to, a control plane of the provider network 100 that includes "backend" services supporting and enabling the services that may be more directly offered to customers.

A cloud provider network can be formed as a number of regions, where a region is a geographic area in which the cloud provider clusters data centers. Each region includes multiple (e.g., two or more) availability zones (AZs) (e.g., including availability zones 108) connected to one another via a private high-speed network, for example a fiber communication connection. An AZ provides an isolated failure domain including one or more data center facilities with separate power, separate networking, and separate cooling from those in another AZ. AZs within a region are positioned far enough away from one other that a same natural disaster (or other failure-inducing event) should not affect or take more than one AZ offline at the same time. Customers can connect to AZ of the cloud provider network via a publicly accessible network (e.g., the Internet, a cellular communication network).

Generally, the traffic and operations of a provider network are broadly subdivided into two categories: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes customer resources that are implemented on the provider network (e.g., computing instances, containers, block storage volumes, databases, file storage). Data plane traffic generally includes non-administrative operations such as transferring customer data to and from the customer resources. The control plane components are typically implemented on a separate set of servers from the data plane servers, and control plane traffic and data plane traffic may be sent over separate/distinct networks.

To provide computing resource services, provider networks 100 often rely upon virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate on/in a VM, an instance that can execute on "bare metal" hardware without an underlying hypervisor), where one or multiple compute instances can be implemented using a single electronic device. Thus, a user may directly utilize a compute instance hosted by the provider network to perform a variety of computing tasks. Additionally, or alternatively, a user may indirectly utilize a compute instance by submitting code to be executed by the provider network (e.g., via an on-demand code execution service), which in turn utilizes a compute instance to execute the code—typically without the user having any control of or knowledge of the underlying compute instance(s) involved.

For example, in various examples, a "serverless" function may include code provided by a user 102 or other entity—such as the provider network 100 itself—that can be executed on demand. Serverless functions may be maintained within provider network 100 by an on-demand code execution service and may be associated with a particular user or account or be generally accessible to multiple users/accounts. A serverless function may be associated with a Uniform Resource Locator (URL), Uniform Resource Identifier (URI), or other reference, which may be used to invoke the serverless function. A serverless function may be executed by a compute instance, such as a VM, container, etc., when triggered or invoked. In some examples, a serverless function can be invoked through an API call or a specially formatted HyperText Transport Protocol (HTTP) request message. Users can thus define serverless functions that can be executed on demand, without requiring the user to maintain dedicated infrastructure to execute the serverless function. Instead, the serverless functions can be executed on demand using resources maintained by the provider network 100. In some examples, these resources may be maintained in a "ready" state (e.g., having a pre-initialized runtime environment configured to execute the serverless functions), allowing the serverless functions to be executed in near real-time.

The provider network 100 illustrated in FIG. 1 includes a database service 110, among any number of other services. According to some examples, the database service 110 enables clients 105 of users to create, manage, and use databases (e.g., relational databases, key-value databases, etc.) in a cloud-based environment in a manner that provides enhanced security, availability, and reliability relative to other database environments. In some examples, the database service 110 features a distributed, fault-tolerant, and self-healing storage system that automatically scales (e.g., implemented in part using a scalable storage layer 112). In some examples, a database system provided by a database service 110 organizes the basic operations of a database (e.g., query processing, transaction management, caching, and storage) into "layers" (or tiers) that can be individually and independently scalable. For example, each database instance provided by the database service 110 includes a database processing layer 162 (which may include one or more database nodes 114, sometimes also referred to as "head nodes"), with a separate storage layer 112 implemented as a distributed storage system (which may include multiple page storage nodes 116 that collectively perform some of the operations traditionally performed in the database processing layer of existing database systems), and optionally a backup storage layer.

In general, a database is a set of data, collection of records, or other grouping of data objects stored in a data store. In some examples, a data store includes one or more directly or network-attached storage devices accessible to a database engine 118 (e.g., block-based storage devices like hard disk drives or solid-state drives). As indicated above, in some examples, the data store is managed by a separate storage layer 112. In some examples, management of the data store at a separate storage layer 112 includes distributing the data amongst multiple different storage nodes (e.g., page storage nodes 116A-116N) to provide redundancy and availability for the data.

In some examples, data for a database is stored in one or more portions of the data store in the form of data pages. One or multiple data values, records, or objects may be stored in a data page. Thus, a query processor 120 (e.g., a query processing thread or process that performs query processing) of a database engine 118 can perform database access requests (e.g., requests to read, obtain, query, write, update, modify, or otherwise access the data) by reading from and/or writing to data pages, which may occur based on state information. The state information can include, for example, data dictionaries, undo logs, transaction logs/tables, indexing structures, mapping information, data page caches or buffers, and the like, or any other information used to perform access requests with respect to the database. As another example, state information may include mapping information (e.g., an index) used to obtain data records that match certain search criteria (e.g., query predicates).

In some examples, some operations of a database (e.g., backup, restore, recovery, log record manipulation, and/or various space management operations) are offloaded from the database engine 118 to the storage layer 112, and can be distributed across multiple storage nodes and/or storage devices. For example, rather than having a database engine 118 itself apply changes to a database (or data pages thereof) and then send the modified data pages to the storage layer 112, the application of changes to the stored database (and data pages thereof) can instead be the responsibility of the storage layer 112 itself. For example, a database engine 118 can send "redo log" records, rather than modified data pages themselves, to the storage layer 112. The storage layer 112 then performs redo processing (e.g., the application of the redo log records) in a distributed manner (e.g., by a background process running on the page storage nodes 116A-116N).

In some examples, log sequence numbers (LSNs) are assigned to the redo log records from a log sequence number space. Crash recovery (e.g., the rebuilding of data pages from stored redo log records) can be performed by the storage layer 112 and may also be performed by a distributed background process. The storage layer 112 maintains backup versions of data volumes in a separate storage system (e.g., in another storage service implemented as part of the cloud provider network 100) by leveraging peer-to-peer replication among storage nodes to identify and obtain new updates to data volumes for inclusion in backup versions.

In some examples, as the query processing engines send redo logs (and not complete modified data pages) to the storage layer 112, there is comparatively much less network traffic between the database processing layer 162 and the storage layer 112 than in other more traditional database systems. For example, each redo log may be on the order of one-tenth the size of the corresponding data page for which it specifies a change, and thus the required bandwidth may be one-tenth in size and the transmission time may be similarly reduced. Note that requests sent from the database processing layer 162 to the storage layer 112 may be asynchronous and thus multiple such requests may be "in flight" at a single point in time.

In some examples, the database systems described herein may retain much of the structure of the "upper half" of a database instance in a processing layer 162 (e.g., performing query parsing and query optimization, query execution, and/or transactionality and consistency management) but may redistribute responsibility for at least portions of the backup, restore, snapshot, recovery, and various space management operations to the storage layer 112. Redistributing functionality in this manner, and tightly coupling log processing between the database layer 162 and the storage layer 112, can thus improve performance, increase availability, and reduce managerial and resource costs when compared to previous approaches to providing scalable databases. For example, as indicated herein, network and input/output (I/O) bandwidth requirements may be reduced because during operation it is "redo log" records (which again are much smaller in size than actual data pages) that are sent across nodes or persisted within the latency path of write operations. In addition, the generation of data pages can be performed independently in the background on each storage node (as foreground processing allows) without blocking incoming write operations. In some examples, the use of log-structured, non-overwrite storage may allow copy creation, backup, restore, snapshots, point-in-time recovery (PITR), and volume growth operations to be performed more efficiently, e.g., by using metadata manipulation rather than the actual movement, copying, or changing of data pages. In some examples, the storage layer 112 may also assume the responsibility for the replication of data stored on behalf of clients (and metadata associated with that data) across multiple storage nodes. For example, data and metadata of a database may be replicated locally (e.g., within a single availability zone 108 in which a collection of page storage nodes 116 executes on its own physically distinct, independent infrastructure) and across availability zones 108 in a single region or in different regions.

In some examples, the database systems described herein can be configured to support standard and/or custom APIs for a variety of database operations. For example, a supported API may support operations for creating a database, creating a table, altering a table, creating a user, dropping a user, inserting one or more rows in a table, copying values, selecting data from within a table (e.g., querying a table), canceling or aborting a query, creating a snapshot, performing an online restore or "backtrack" operation, etc., among many other possible operations known to those of skill in the art.

In some examples, each data page may be stored in a "segment," such that each segment (e.g., segment 122A) stores a collection of one or more pages 124, redo logs 126, and/or change log data 140. The pages 124 may include data pages constructed based on the redo logs 126 and/or change log pages constructed based on the change log data 140. Thus, redo logs 126 or change logs may be segmented to a protection group 128 of which the segment is a member. In some examples, data pages and/or redo logs and/or change logs are mirrored across multiple storage nodes, according to a variable configuration, such as in a protection group 128 (which may be specified by the client on whose behalf the databases are being maintained in the database system). For example, in some examples, one, two, or three copies of the data or redo logs or change logs may be stored in each of one, two, or three different availability zones or regions, according to a default configuration, an application-specific durability preference, or a client-specified durability preference.

In some examples, a user's database created using a database service 110 is implemented by one or more database nodes 114, each hosting one or more database engines (e.g., database engine 118) and a fleet of page storage nodes 116. In some examples, a database engine 118 includes various components associated with a traditional database kernel, including a query processor 120 and other components implementing transactions, locking, caching, access methods, and undo management. In some examples, the database engine 118 further includes one or more of a page cache 150 to store database pages, a prefetch engine 152, a page graph 160, a pattern store 154, and a prefetch queue 156 as described in detail herein.

In some examples, a database node 114 receives requests (e.g., queries to read or write data, etc.) from various client 105 applications (e.g., a client 105A implemented within the provider network 100, such as via a hardware virtualization service, or by an external client 105B), and use query processors 120 that parse the requests, optimize the requests, and develop an execution plan to carry out the associated database operations. For example, the database engine 118 may determine which database pages it needs to access, obtains these database pages (e.g., from a page cache 150 and/or the storage layer 112), and uses the pages to process the query. In some examples, the database engine 118 returns query responses to the client 105 applications, which may include write acknowledgements, requested data pages (or portions thereof, or results generated based on portions of these pages), error messages, and other responses as appropriate.

In some examples, a database node 114 may receive database traffic 136 in the form of SQL requests from client applications, e.g., through an Open Database Connectivity (ODBC) interface, Java Database Connectivity (JDBC) interface, or even an HTTP-based interface, and may utilize query processors 120 to perform processing using database pages. Rather than generating data pages locally, the database engine 118 generates redo log records and sends the redo log records to the appropriate page storage nodes 116 of the separate distributed storage layer 112. In some examples, a client-side driver 130 for interacting with the distributed storage layer 112 is hosted on the database node 114 and is responsible for routing redo log records 132 to the storage layer 112 page storage node(s) 116 that store the segments (or data pages thereof) to which those redo log records 132 are directed.

Additionally, in some cases users of the database service 110 may desire to enable change logs, e.g., in the form of binary logging (or "bin logging") via use of a binlog. Generally, a binlog is one type of change log that may be a set of one or more files containing a record of all statements that attempt to change table data of the database (e.g., updates, insertions, deletions). These statements can be replayed to bring secondary servers up to date in a replication scenario, to bring a database up to date after restoring table data from a backup, etc. In many databases, change logging can be turned on and off. Thus, in some examples, for all database statements that change table data of the database, another stream of data—in the form of change log records 133—can also be sent to ones of the page storage nodes 116 and stored as change log data 140.

In some examples, each segment 122 of a database is replicated (or otherwise made durable) on multiple storage system nodes 116 that form a "protection group." In such examples, the client-side driver 130 tracks the page storage nodes 116 on which each segment is stored and routes redo log records 132 to all of the nodes on which a segment is stored (e.g., asynchronously and in parallel) when a client request is received. As soon as the client-side driver 130 receives an acknowledgment back from a write quorum of the page storage nodes 116 in the protection group (which may indicate that the redo log record has been written to the storage node), it sends an acknowledgment of the requested change to the database processing layer 162 (e.g., to the database engine 118). For example, in examples in which data is made durable through the use of protection groups 128, the database engine 118 may not be able to commit a transaction unless and until the client-side driver 130 receives a reply from enough page storage nodes 116 to constitute a write quorum, as defined in a protection group policy for the data.

In some examples, the database processing layer 162 (e.g., each database node 114 or database engine 118) includes a page cache 150 in which recently accessed data pages are held temporarily. In such examples, if a write request is received that targets a data page held in such a cache 150, in addition to sending a corresponding redo log record 132 to the storage layer 112, the database engine 118 may apply the change to the copy of the data page held in its cache 150. A data page held in this cache 150 may not ever be flushed to the storage layer 112 and may be discarded (e.g., at any time after the redo log record for a write request that was most recently applied to the cached copy has been sent to the storage layer 112 and acknowledged as being durable by the storage layer 112). The page cache 150 may implement any of various locking mechanisms to control access to the cache by at most one writer (or multiple readers) at a time, in different examples. Note, however, that in examples that include such a page cache 150, it typically is not distributed across multiple nodes but exists only on the database node 114 for a given database instance, e.g., for use by one or more query processors 120 (e.g., query processing threads or processes). Therefore, in some examples, there may be no cache coherency or consistency issues to manage.

As indicated above, in some examples, a database node 114 includes a client-side storage driver 130 that routes read requests or redo log records 132 to various page storage nodes 116 within the storage layer 112, receives write acknowledgements from the storage layer 112, receives requested data pages from the storage layer 112, or returns data pages (or portions/derivations thereof), error messages, or other responses to a database engine 118. In some examples, the client-side driver 130 running on the database node 114 may expose a private interface to one or more other components (e.g., other database engines or virtual computing service components). In some examples, storage for a database instance in the storage layer 112 may be modeled as a single volume that can grow in size without limits and that can have an unlimited number of Input/Output Operations Per Second (IOPS) associated with it. When a volume is created, it may be created with a specific size, with specific availability/durability characteristics (e.g., specifying how it is to be replicated) and with an IOPS rate associated with it (e.g., both peak and sustained). A variety of different durability models may be supported, and users may be able to specify, for their database, a number of replication copies, availability zones, or regions and whether replication is synchronous or asynchronous based upon their durability, performance, and cost objectives.

In some examples, the client-side driver 130 may maintain metadata about these volumes and directly send asynchronous requests to each of the page storage nodes 116 necessary to fulfill read and write requests without requiring additional hops between page storage nodes 116. In some examples, the volume metadata indicates which protection groups 128, and their respective page storage nodes 116, maintain which partitions of the volume. For example, in some examples, in response to a request to make a change to a database, the client-side driver 130 determines the protection group 128, and its one or more page storage nodes 116 that are implementing the storage for the targeted data page, and routes the redo log record(s) 132 specifying that change to those storage nodes. The page storage nodes 116 may then be responsible for applying the change specified in the redo log record to the targeted data page at some point in the future. As writes are acknowledged back to the client-side driver 130, the client-side driver 130 may advance the point at which the volume is durable and may acknowledge commits back to the database engines 118. As previously noted, in some examples, the client-side driver 130 may not ever send data pages themselves to the page storage nodes 116. This may not only reduce network traffic but may also remove the need for the checkpoint or background writer threads that constrain foreground processing throughout in previous database systems.

In some examples, many read requests may be served by the database node 114 utilizing its page cache 150. However, write requests may require durability since large scale failure events may be too common to allow only in-memory replication. Therefore, the systems described herein may minimize the cost of the redo log record write operations that are in the foreground latency path by implementing data storage in the storage layer 112 as two regions: a small append-only log-structured region into which redo log records 132 are written when they are received from the database processing layer 162, and a larger region in which redo log records are coalesced together to create new versions of data pages in the background. In some examples, an in-memory structure may be maintained for each data page that points to the last redo log record for that page, backward chaining redo log records until an instantiated data block is referenced. This approach may provide good performance for mixed read-write workloads including applications in which reads are largely cached.

In some examples, copies of databases may be created in the storage layer 112 that share data pages with the source of the copy. For example, a copy of a portion of a database (e.g., an extent of a database volume 134) may be stored on the same storage node as the source database and include pointers to data pages stored in the source database so that the resulting amount of storage consumed by the copy is limited to storing changes to data pages that differ from the original copy, providing a copy-on-write technique for creating and updating copies of a database. Although not illustrated in FIG. 1, in some examples, the page storage nodes 116 also interface with a separate backup data store, system, service, or device. In this example, various data, such as data pages, redo log records, and any other data maintained by distributed storage service internal clients, such as database service 110 or other virtual computing services, or external clients, may be sent periodically to a backup data store.

In some examples, different storage policies are implemented by the database service 110. Examples of such storage policies include a durability policy (e.g., a policy indicating the number of instances of a database (or data pages thereof) that will be stored and the number of different storage nodes on which they will be stored) and a load balancing policy (which may distribute databases, or data pages thereof, across different storage nodes, volumes, or disks in an attempt to equalize traffic). In addition, different storage policies may be applied to different types of stored items by various services. For example, in some examples, the storage service may implement a higher durability for redo log records than for data pages, etc.

As indicated above, in some examples, a database service 110 replicates users' databases to provide resiliency to failure. In some examples, a user's database is partitioned into fixed size segments 122, each of which is replicated across the page storage nodes 116. In some examples, each set of fixed sized segments replicated across the page storage nodes 116 is grouped into a protection group (e.g., one of protection groups 128), such that each protection group is made up of N fixed size segments organized across M availability zones 108. In some examples, a logical database volume 134 used to store the data of a database is thus a concatenated set of protection groups 128, physically implemented using a fleet of storage nodes (e.g., including page storage nodes 116A-116N) provided as virtual hosts with attached SSDs. In some examples, the protection groups that constitute a volume are allocated as the volume grows, where the database service 110 may support volumes that can grow up to a defined size limit (e.g., 64 TB or any other limit).

In some examples, a page storage node 116 includes hardware and software implementing various segment management functions. For example, each storage node may perform any or all of the following operations: replication (e.g., locally within the storage node), coalescing of redo logs to generate data pages, log management (e.g., manipulating redo log records), crash recovery (e.g., determining candidate redo log records for volume recovery), creating snapshots of segments stored at the storage node, and/or space management (e.g., for a segment or state storage). In some examples, each page storage node 116 has one or more attached storage devices (e.g., SSDs, HDDs, or other persistent non-volatile storage devices) on which data blocks may be stored on behalf of clients.

In some examples, each of the page storage nodes 116 implements processes running on the node that manage communication with one or more database nodes 114, for example, to receive redo log records 132, send back requested data pages, etc. In some examples, data blocks written to the storage system may be backed up to long-term or archival storage (e.g., in a non-illustrated remote key-value durable backup storage system).

In some examples, a storage layer 112 implements a non-illustrated storage service control plane that performs various storage system management functions. For example, a storage service control plane may implement a volume manager, which may maintain mapping information or other metadata for a database volume 134, such as current volume state, current writer, truncation tables, or other truncation information, or any other information for a volume as it is persisted in varying extents, segments, and protection groups. In some examples, the volume manager communicates with a client-side driver 130 to "mount" or "open" the volume for the client, providing the client-side driver 130 with mapping information, protection group policies, and various other information used to send write and read requests to page storage nodes 116. The volume manager may provide the maintained information to storage clients, such as a database node 114 or client-side driver 130 or to other system components such as a backup agent. For example, the volume manager may provide a current volume state (e.g., clean, dirty, or recovery), current epoch or other version indicator for the volume, or any other information about a data volume.

FIG. 1 illustrates a process that includes a database node 114 processing database traffic 136. In some examples, clients 105 of the database service 110 may submit queries and other requests associated with a particular database instance in a number of ways, e.g., via an SQL-type interface to the database system. In some examples, external applications and programs may submit queries using ODBC or JDBC driver interfaces to the database system.

In some examples, database traffic 136 is received and processed by the database node(s) 114, where the traffic includes operations that modify the content of a particular database. In some examples, clients 105 of the database instance can include any type of client configurable to submit requests to network-based services via a network, including requests for database services (e.g., a request to create a copy of a database, etc.). For example, a given client may include a suitable version of a web browser or may include a plug-in module or other type of code module that can execute as an extension to or within an execution environment provided by a web browser. Alternatively, a client 105 can include a database application, a media application, an office application, or any other application that makes use of persistent storage resources to store and access one or more databases. In some examples, such an application includes sufficient protocol support (e.g., for a suitable version of HTTP) for generating and processing network-based services requests without necessarily implementing full browser support for all types of network-based data. That is, a client 105 may be an application that can interact with the cloud provider network 100 (e.g., a remote client 105B) or within the cloud provider network 100 (e.g., a client 105A). In some examples, clients may generate network-based services requests according to a Representational State Transfer (REST)-style network-based services architecture, a document-based or message-based network-based services architecture, or another suitable network-based services architecture. Accordingly, a client 105B may be executed by a computing device 104 outside of the provider network 100 or the client 105A may be within the provider network 100 (e.g., as an application executed by a hardware virtualization service, for example).

In some examples, the database traffic 136 is generated by a client 105 application that provides access to storage of databases or other applications in a manner that is transparent to those applications. For example, the client 105 application may integrate with an operating system or file system to provide storage in accordance with a suitable variant of the storage models described herein. However, the operating system or file system may present a different storage interface to applications, such as a conventional file system hierarchy of files, directories, or folders. In such an example, applications may not need to be modified to make sure of the storage system service model. Instead, the details of interfacing to the cloud provider network 100 may be coordinated by the client application and the operating system or file system on behalf of applications executing within the operating system environment. In some examples, the client application generating database traffic 136 send network-based services requests (e.g., a request to create a copy of a database, queries to a database, etc.) to and receive responses from the cloud provider network 100 via one or more intermediate networks 106.

In some examples, a cloud provider network 100 implements various user management features. For example, the cloud provider network 100 may coordinate the metering and accounting of client usage of network-based services, including storage resources, such as by tracking the identities of requesting clients, the number or frequency of client requests, the size of data tables stored or retrieved on behalf of the clients, overall storage bandwidth used by clients, class of storage requested by clients, or any other measurable client usage parameter. In some examples, a cloud provider network 100 also implements financial accounting and billing systems or may maintain a database of usage data that may be queried and processed by external systems for reporting and billing of client usage activity. In some examples, the cloud provider network 100 collects, monitors, or aggregates a variety of storage service system operational metrics such as metrics reflecting the rates and types of requests received from clients, bandwidth utilized by such requests, system processing latency for requests, system component utilization, rates and types of errors resulting from requests, characteristics of storage and requested data pages or records thereof (e.g., size, data type, etc.) or any other suitable metrics. In some examples, such metrics may be used by system administrators to tune and maintain system components, while in other examples such metrics may be exposed to users to enable such users to monitor their usage of the database service 110 and other services.

In some examples, a cloud provider network 100 also implements user authentication and access control procedures. For example, for a given network-based services request to access a particular database instance, the cloud provider network 100 may ascertain whether the requesting client associated with the request is authorized to access the particular database instance. The cloud provider network 100 may determine such authorization by, for example, evaluating an identity, password, or other credential against credentials associated with the particular database, or by evaluating the requested access to the particular database against an access control list of the particular database, in some examples. For example, if a client does not have sufficient credentials to access a particular database, the cloud provider network 100 may reject the corresponding request, for example, by returning a response to the client indicating an error condition.

When a traditional database modifies a data page (e.g., in response to a write operation), it generates a redo log record and invokes a log applicator that applies the redo log record to the in-memory before-image of the page to produce its after-image. Transaction commit requires the log to be written, but the data page write may be deferred. As described herein, in some examples, the writes that cross the network are redo log records 132, though changelog records 133 may also be transmitted. As shown in FIG. 1, a database engine 118 processing a write sends redo log records 132 to the storage layer 112.

In some examples, a log applicator functionality is implemented at the storage layer 112 where it can be used to generate database pages in the background or on demand. Generating each page from the complete chain of its modifications from the beginning of time may be prohibitively expensive and, thus, in some examples, each page storage node 116 continually or periodically materializes database pages in the background to avoid regenerating them from scratch on demand each time one is requested. The page storage nodes use the redo log records (e.g., redo logs 126 associated with segment 122A) to apply changes to their buffer caches. The database engine awaits quorum from the page storage nodes to satisfy the write quorum and to consider the redo log records in question to be durable or hardened.

As indicated above, database query requests of database traffic 136 may include requests to write to various data pages of a database instance. These requests are parsed and optimized to generate one or more write record requests, which may be sent to the client-side driver 130 for subsequent routing to the storage system. In this example, the client-side driver 130 generates one or more redo log records 132 corresponding to each write record request and sends them to specific ones of the page storage nodes 116 of specific protection groups 128 storing the partition user data of user data space to which the write record request pertains. In some examples, page storage nodes 116 perform various peer-to-peer communications to replicate redo log records received at a page storage node to other page storage nodes that may not have received the redo log records. In some examples, the client-side driver 130 generates metadata for each of the redo log records that includes an indication of a previous LSN of a log record maintained at the specific protection group.

In some examples, each redo log record 132 is associated with an LSN that may typically be a monotonically increasing value generated by the database. In some examples, a database node 114 continuously interacts with the storage layer 112 and maintains state to establish quorum, advance volume durability, and register transactions as committed. As the database receives acknowledgements to establish the write quorum for each batch of redo log records, it advances the current volume durable LSN (or "VDL"). As noted, a data volume may consist of multiple extents, each represented by a protection group consisting of one or more segments. In some examples, redo log records 132 directed to different extents may have interleaved LSNs. For changes to the volume to be durable up to a particular LSN, it may be necessary for all redo log records up to that LSN to be durable, regardless of the extent to which they belong. In some examples, the client-side driver 130 keeps track of outstanding redo log records that have not yet been made durable, and once all redo log records up to a specific LSN are made durable, it may send a VDL message to one of the protection groups in the volume. The VDL may then be written to all synchronous mirror segments for the protection group.

As shown in FIG. 1, a database node 114 may include a prefetch engine 152 than prefetches database pages that are predicted (or, are deemed sufficiently likely) to be needed by ones of the one or more query processors 120 of the database node 114. However, given a typically huge number of potential database pages to select from, together with the comparatively small amount of space available in a page cache 150 in which to store such pages, the prefetch engine 152 must accurately determine which particular database pages should be prefetched at which particular points in time. If the prefetch engine 152 is unable to do this well and none of the prefetched database pages are useful for processing purposes, this can result in decreased performance due to processing resources of the database node utilized by the prefetch engine 152 (in performing the prefetching) were wasted as well as memory resources of the database node being wasted.

Accordingly, in some examples, this prefetch engine 152 identifies particular data pages to prefetch that are highly likely to be used at particular points in time. This identification can be performed based on analysis of observed database page access patterns (stored in a pattern store 154 data structure or storage location), which can include identifying frequent page access patterns and storing them in a space and access-efficient page graph 160 data structure. Upon a query processor 120 beginning to process a query, it can utilize the page graph 160 to determine if it is beginning to follow a known page access pattern, and if so, indicate to the prefetch engine 152 (e.g., by placing an entry into a prefetch queue 156) that prefetching may be warranted.

When performing database processing, the query processor(s) 120 (and/or client-side driver 130) may keep track of sequences of database page identifiers (e.g., page numbers) that were accessed as part of processing queries.

For example, a query processor 120 processing a first type of query (one or multiple times) may access database pages {1, 2, 3, 4, 5, 6, 7} and the query processor 120 processing a second type of query (one or multiple times) may access database pages {1, 2, 3, 4, 5, 600, 601, 602, 603}. The query processor 120 may update a pattern store 154 (e.g., with an insertion or update of a record) to reflect these particular database page patterns—e.g., the database page sequence {1, 2, 3, 4, 5, 6, 7} may be inserted many times and the database page sequence {1, 2, 3, 4, 5, 600, 601, 602, 603} may be inserted some other number of times.

At some point, the prefetch engine 152 may analyze the contents of the pattern store 154 and may—or may not—identify entire sequences or subsets of sequences as being sufficiently common and thus update a page graph 160 to capture the sequence(s). This determination may be made based on how many times a particular sequence is observed in the pattern store 154 (e.g., more times indicates a higher likelihood), how many different sequences are observed in the pattern store 154 (e.g., with fewer different sequences each sequence indicates a higher likelihood), how much space is available at that specific database node for prefetching (e.g., with a smaller amount of space a higher frequency of sequence occurrence may be required), etc. This determination may additionally, or alternatively, be based on the use of a trained machine learning (ML) model that receives sequences as inputs and identifies whether the entire sequence—or a portion thereof—is important enough to warrant inclusion in the page graph 160.

Continuing this simple example, the prefetch engine 152 may be configured to detect both patterns are being sufficiently frequent and update the page graph 160 accordingly. Thus, the page graph 160 may include nodes for each database page, and edges joining nodes to correspond to pages that are seen consecutively (e.g., an edge between the nodes for page 1 and 2 but not an edge between nodes 1 and 4). Weights for the edges may be used, in some examples, to reflect the frequency (or other aspect) of a particular sequence of pages that have been seen. For example, weights for edges between nodes 1 and 2 and 3 and 4 and 5 may be comparatively higher (due to this pattern existing in all observed sequences) than weights for edges between 5 and 6 and 7, or between weights for edges between 5 and 600 and 601 and 602 and 603 and 604. Further, if there are far more page access patterns for {1, 2, 3, 4, 5, 6, 7} than those for {1, 2, 3, 4, 5, 600, 601, 602, 603}, the weights for edges between nodes 5 and 6 and 7 may be comparatively higher than weights for edges between 5 and 600 and 601 and 602 and 603 and 604.

Thus, assuming the page cache 150 is empty (or does not include these needed database pages), a query processor 120 may begin to process a query and determine that it needs database page 1. The query processor 120 may determine that a node exists in the page graph 160 for page 1, and may indicate (e.g., via its own tracking variable) that it has matched a sequence of one node in the graph 160 (and may keep a pointer to this node as a "current" matched node). Per configuration—which may be specified by the system implementor or the user associated with the database—the query processor 120 may determine that it has not hit a "minimum matched node sequence" threshold (or, "prefetch threshold" required for initiating prefetching—this example assumes the value is 3. The query processor 120 may thus fetch database page 1 via its typical retrieval process.

Next, in continuing its query processing, the query processor 120 may determine that it needs database page 2, and determine that an edge exists leading from the current matched node (node 1) to a node for page 2. The query processor 120 may likewise indicate (e.g., via its tracking variable) that it has matched a sequence of two nodes in the graph 160, and that this value of 2 is less than the minimum matched node sequence value of 3. The query processor 120 may thus keep a pointer (or identifier) to the node representing database page 2, and may fetch database page 2 via its typical retrieval process.

Next, in continuing its query processing, the query processor 120 may determine that it needs database page 3, and determine that an edge exists leading from the current matched node (node 2) to a node for page 3. In this case, the query processor 120 may note (e.g., via its tracking variable) that it has now matched a sequence of three nodes in the graph 160, and that this value of three is equal to the minimum matched node sequence value of three. Thus, the query processor 120 may insert a value into the prefetch queue 156 indicating that the query processor 120 has hit node 3 (and inherently indicating that it has also reached the prefetch threshold).

While the query processor 120 continues its processing (optionally retrieving page 3), etc., the prefetch engine 152 can determine that the identifier of page 3 is in the prefetch queue 156 (e.g., via being notified through a push type notification or subscription to a stream of updates, or via a periodic monitoring of the prefetch queue 156) and analyze the page graph 160 to determine which, if any, database pages should be prefetched.

For example, the query processor 120 may start at the node corresponding to page 3 in the graph and, based on the weights of the edges leading out of page 3, identify one or more subsequent nodes/database pages to be prefetched. For example, in some cases the query processor 120 may select a single edge out of each node having a highest weight and continue traversing the graph for some number of nodes (e.g., 4). In that example, the query processor 120 may traverse nodes for the database page sequence 3-4-5-6-7, and thus determine to prefetch either pages 4-5-6-7 or 3-4-5-6 (such as when the query processor 120 is not prefetching the page itself), placing these pages into the page cache 150 for the query processor 120 to hopefully use next, which is far quicker than having to pull back the pages on its own. Based on the observed set of access patterns, we conclude it is highly likely that the query processor 120 will in fact require these pages, and thus, overall processing speed is improved.

In some examples, despite these pages existing in the page cache 150, the query processor 120 may continue tracking its accessed page sequence in the page graph 160 as described above. In the event of the query processor 120 continuing upon a sequence represented in the graph—but not having database pages already in the page cache 150—the query processor 120 may again immediately be able to insert an identifier for a "next" page in the sequence into the prefetch queue 156, allowing for another batch (e.g., 4 pages) of pages to be prefetched, due to it having hit a successive number of connected nodes in the graph (e.g., 7) that is larger than the minimum matched node sequence value of three.

The prefetching may also be done in other ways, such as by potentially fetching more than one page when more than one subsequent node is connected to a node in the sequence. Continuing the example, instead of just fetching nodes that are connected in the path having a highest weight (e.g., pages 4-5-6-7), the prefetch engine 152 may be configured to fetch pages for all successive nodes (e.g., potentially pages 4-5-6-7 and also pages 600-601-602-603), or pages for all successive nodes where the edge is greater than some weight value. This determination may also be based on other values, such as an availability of space within the page cache 150, where more pages can be prefetched when the page cache 150 is relatively empty, while fewer pages are prefetched when the page cache 150 is comparatively full.

Figure 2:
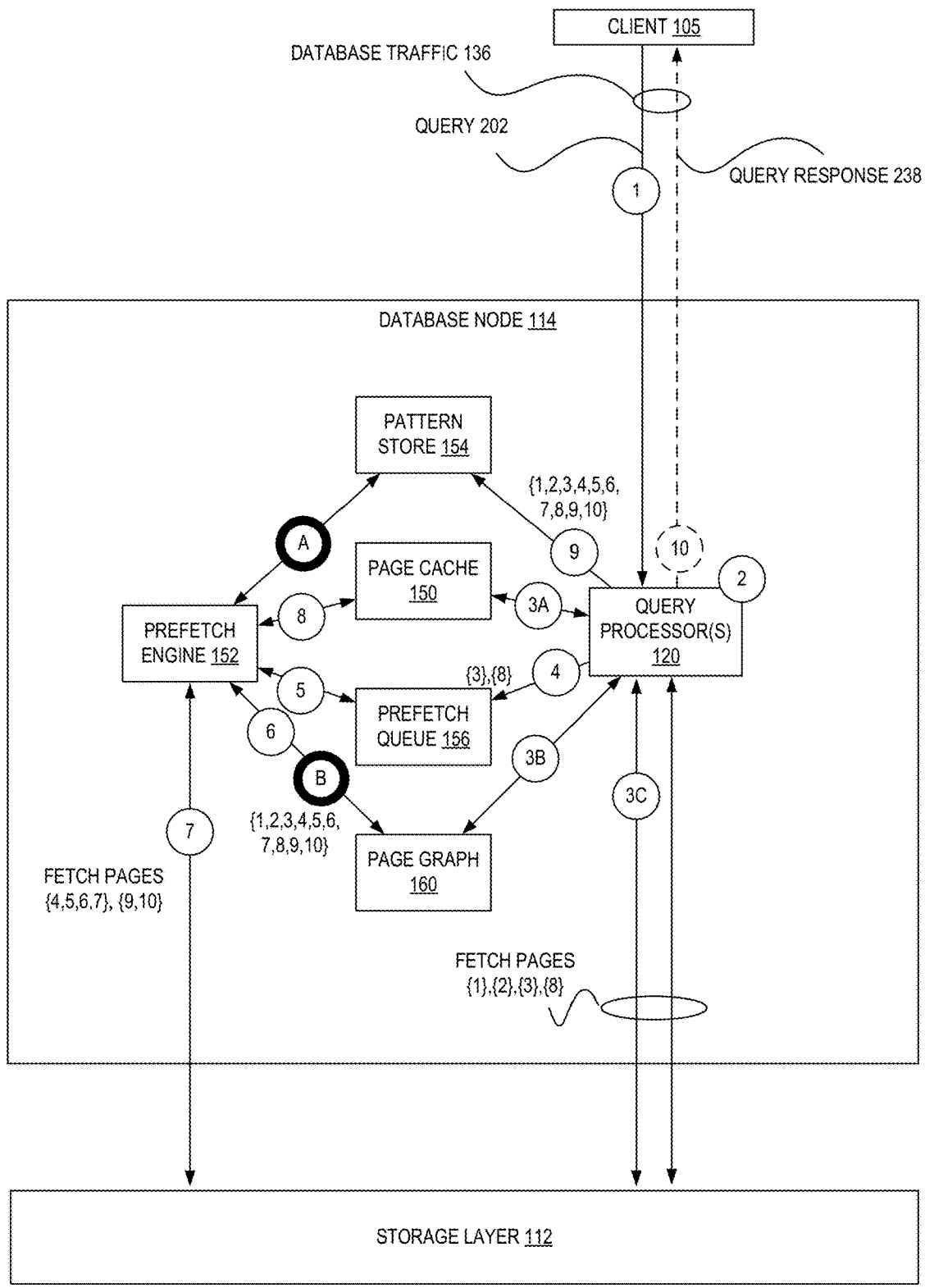
FIG. 2 illustrates operations of components of an exemplary system performing query processing and intelligent database page prefetching according to some examples.

For further detail, FIG. 2 illustrates operations of components of an exemplary system performing query processing and intelligent database page prefetching according to some examples. In this example, at circle (A) the prefetch engine 152 may analyze a pattern store 154—such as through the use of examining the frequency and/or overlap and/or timing of various patterns therein—to determine which sequences or subsequences of patterns are to be included in the page graph 160.

At circle (B), any new sequences are inserted (or, existing sequences are adjusted, such as by increasing weights of edges). In some embodiments, the insertion into the page graph 160 may be performed via a ready-copy-update technique known to those of skill in the art to avoid impacting query processors 120 that may be also attempting to read the page graph 160. In our example, we assume that at least a sequence of nodes corresponding to pages one through ten is inserted.

Thereafter, at some point, at circle (1) a query 202 is sent by a client 105 and received at a database node 114 that provides processing for the database instance associated with the client and/or query. As reflected by circle (2), the query processor 120 may determine that it first needs to obtain page "1" and may check the page cache 150 at circle (3A) to determine that it does not exist there. At circle (3B), the query processor 120 may utilize the page graph 160 to determine that page "1" is included in the graph 160, and it may thus keep record of its last hit node (e.g., node 1) and the length of the pattern it is matched so far (e.g., one node) as part of processing this query. As the pattern length matched so far (one) is less than a configured prefetch threshold value (e.g., three), the query processor 120 at circle (3C) may then fetch page 1 and use it for typical processing.

Next, as again reflected by circle (2), the query processor 120 may determine that it now needs to obtain page "2" and may check the page cache 150 at circle (3A) to determine that it does not exist there. At circle (3B), the query processor 120 may utilize the page graph 160 to determine that page "2" is connected to page "1" via an edge in the graph 160, and it may keep record of its last hit node (e.g., node "2") and the length of the pattern it is matched so far (e.g., two nodes) as part of processing this query. As the matched pattern length of two is less than the prefetch threshold of three, the query processor 120 at circle (3C) may then fetch page "2" and use it for typical processing.

Similarly, as again reflected by circle (2), the query processor 120 may determine that it now needs to obtain page "3" and may check the page cache 150 at circle (3A) to determine that it does not exist there. At circle (3B), the query processor 120 may utilize the page graph 160 to determine that page "3" is connected to page "2" via an edge in the graph 160, and it may keep record of its last hit node (e.g., node "3") and the length of the pattern it is matched so far (e.g., three nodes) as part of processing this query. As the matched pattern length of three is the same as the prefetch threshold of three, the query processor 120 may both fetch page "3" (at circle (3C)) and use it for typical processing and also, at circle (4), insert value "3" (corresponding to node 3) into the prefetch queue 156.

At circle (5), the prefetch engine 152 detects the existence of this value in the queue (e.g., by checking the queue for entries when it is available for prefetching, via a notification, etc.) and may at circle (6) use the page graph 160 to identify a set of pages to prefetch-here, we assume it has determined to fetch pages "4," "5," "6," and "7." These pages are inserted into the page cache 150 at circle (8). Thereafter, we assume that the query processor 120 will need these pages and can directly access them from the page cache 150, which may be implemented on a same node or device and thus may be much faster than accessing it from a separate, network-attached storage layer 112.

At some point, we assume that the query processor 120 needs database page "8," which despite being included in the page graph 160 might not have been prefetched (e.g., due to the prefetch engine 152 being configured to only prefetch a maximum threshold number of pages at a time, such as four). Similar to what the query processor 120 did for page "3," the query processor 120 may determine that page 8 is not in the page cache 150, may determine that it is connected via an edge from its previously accessed node, that it has accessed at least a minimum number of consecutive nodes in a sequence in the graph, and thus insert the value "8" into the prefetch queue 156. Again, this causes the prefetch engine 152 to obtain this value, analyze the graph, and determine to prefetch pages 9-10, which are inserted into the page cache 150.

Upon finishing the processing—we assume in this example after use of page 10—the query processor 120 can insert a description of the pattern (e.g., {1,2,3,4,5,6,7,8,9, 10}) into the pattern store 154, which will allow for subsequent analysis by the prefetch engine 152, e.g., to determine whether some or all of this sequence remains important enough for inclusion in the page graph 160. The query processor 120 can also return a result of the query, in the form of a query response 238 message, to the client.

In some examples, the prefetch engine 152 may also be adapted to remove or prune nodes/sequences from the page graph 160. For example, on a scheduled basis, the prefetch engine 152 may decrement the edge weights for every edge in the graph by some amount, and when an edge becomes zero, the edge may be removed, and a node may be removed when a node is no longer connected to any other node by an edge. However, other schemes may be used, such as by periodically adjusting the weights based on how often a particular page was used recently, where more recently accessed nodes will continue to have higher weights than less recently accessed nodes.

Thus, over time, a graph 160 can be pruned by the prefetch engine 152 to ensure that the size of the graph does not grow too large. In some examples, a set of thresholds may also be used to help control the size of the graph, such as a data/file size, number of nodes, etc., that if reached cause the prefetch engine 152 to more aggressively prune the graph, such as by adjusting a decay function (e.g., to more quickly remove "old" nodes/edges from the graph), reducing a weight threshold needed to make an edge a candidate for removal, etc.

In some examples, a feedback loop type mechanism is used to control the updating of the graph 160. For example, the prefetch engine 152 (or a related component) can measure its prefetch effectiveness, e.g., by determining how many pages that are prefetched are actually used. Based on this measurement, the prefetch engine 152 can adjust its actions (e.g., a number of pages to prefetch, how often or quickly to trigger prefetches) to improve the performance of the system. For example, if over a period of time the prefetch effectiveness is around 40% (meaning that only 40% of prefetched pages are subsequently used), the prefetch engine 152 may use this feedback to reduce the number of pages that are prefetched at a time, thus avoiding "cluttering" the prefetch cache with non-useful pages. Similarly, if the prefetch effectiveness is around 100%, then the prefetch engine 152 may determine to prefetch even more pages at a time, which can improve overall performance by having more pages instantly available for query processing.

Figure 3:
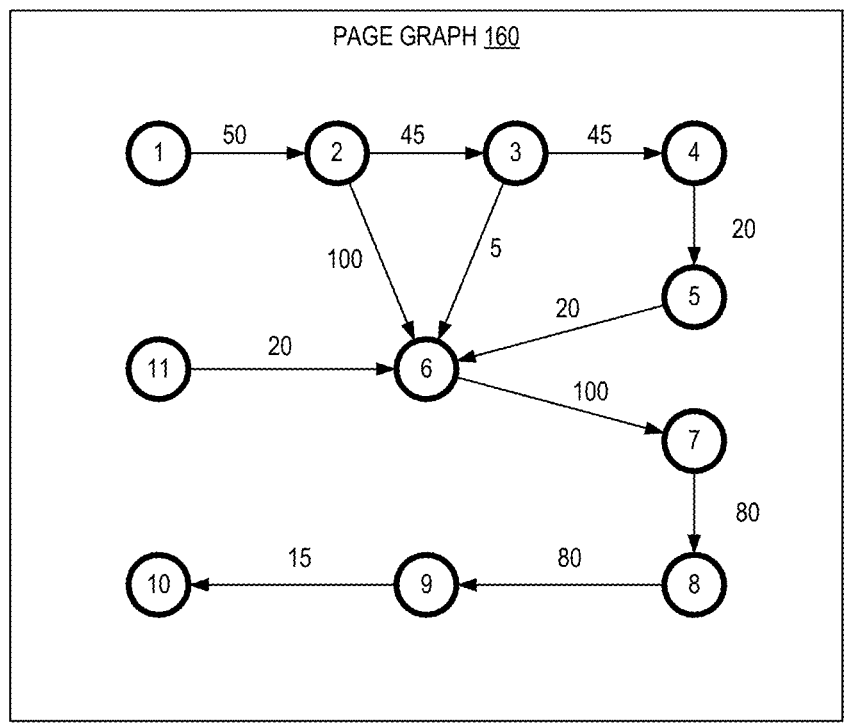
FIG. 3 illustrates one exemplary page graph for improved query processing through intelligent database page prefetching according to some examples.
Figure 3:
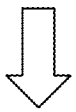

FIG. 3 illustrates one exemplary page graph 160 for improved query processing through intelligent database page prefetching according to some examples. In this example, the page graph 160 is a directed acyclic graph (DAG) though in other examples other types of graphs can similarly be used with minimal adjustments. As shown, the graph includes nodes corresponding to database pages, where each page is represented with a number inside the corresponding circle. Further, each edge is shown as being directional and including an edge weight; in this example, the edge weights are integers up to 100 in value, and an edge weight of 0 leads to the edge being removed. The edge weights may be set with comparatively larger values to cause particular sequences of database pages to be prefetched, which may be those sequences that are determined to be most likely to be needed in the near term. Thus, when prefetching is to be performed and a limited amount of cache storage is available, the "most" likely pages to be needed next will be prefetched over pages that are less likely to be needed next.

As is known in the art, graphs can be stored in a variety of manners (e.g., as a tree type data structure), many of which are extremely small in space and can be very fast to traverse. One format-again, of many possible formats implementable by those of skill in the art—is shown at the bottom of FIG. 3 as page graph representation 300. Page graph representation 300 includes a row for each node in the graph having an edge going to another node, thus, there is no line for node ten. In this format, each such node is listed first with an "arrow" identifying each node that it points to in the graph, together with a parenthetical value indicating the weight of the edge that joins these nodes. For example, node 1 is shown as being connected with an outward edge going toward node 2, where the edge has a weight of 50. Similarly, node 2 is shown with two outward edges-one toward node 3 (with a weight of 45), and one toward node 6 (with a weight of 100).

Figure 4:
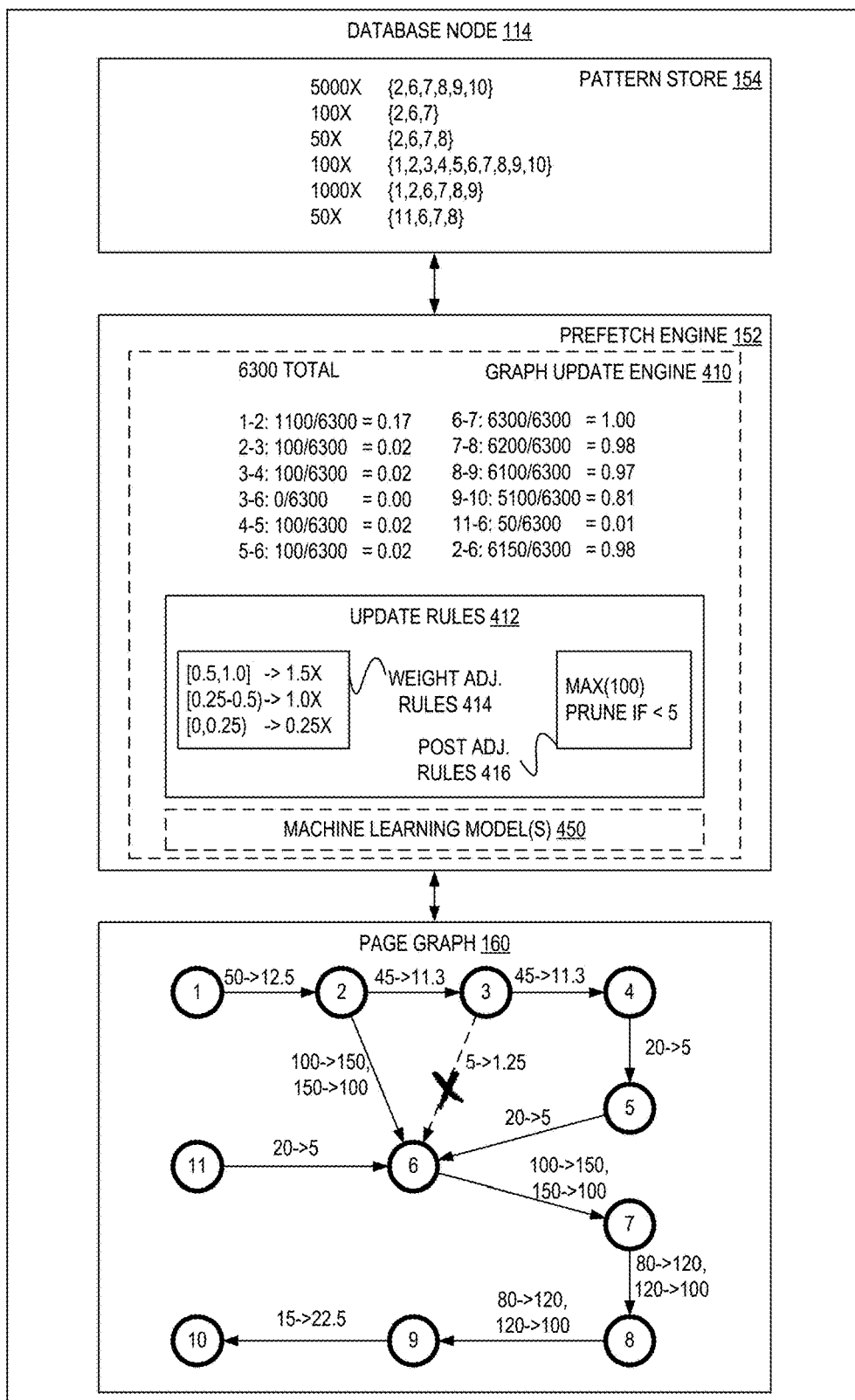
FIG. 4 illustrates one exemplary set of operations for updating page graph edge weights based on observed patterns for improved query processing through intelligent database page prefetching according to some examples.

FIG. 4 illustrates one exemplary set of operations for updating page graph edge weights based on observed patterns for improved query processing through intelligent database page prefetching according to some examples. In this example, the pattern store 154 may include six different sequences that were observed in a recent amount of time with various frequencies-here, the sequence {2,6,7,8,9,10} was observed five-thousand times, while the pattern {2,6,7,8} was observed only fifty times.

Based on these patterns in the pattern store 154, the prefetch engine 152 can perform analysis to determine which sequences (or patterns) or sub-sequences should be included or updated in the page graph 160. In this particular example, the prefetch engine 152 is configured to insert nodes and edges if they are observed but do not exist in the page graph (e.g., with a default edge weight, such as 100), and to update edge weights in the page graph 160, via use of a set of one or more software modules referred to as the graph update engine 410.

In this example, the graph update engine 410 determines a total number of observed patterns—here, 6300—and for each observed node to node (or page to page) connection, the graph update engine 410 computes its prevalence within the overall set of patterns. Thus, as a connection from node 1 to node 2 is observed in a total of 1100 patterns (e.g., 100 times within {1,2,3,4,5,6,7,8,9,10} and 1000 times within {1,2,6,7,8,9}), and as there are 6300 observed pattern instances, the graph update engine 410 calculates an importance factor for the edge to be 1100/6300, or 0.17. Such node-to-node edge values can be calculated for all observed node-to-node connections in the patterns, as illustrated within the graph update engine 410. In this example, these importance factors range from 0 at a minimum to 1.00 at a maximum, though in other examples the range of values, significant digits, etc., can be different.

Next, the graph update engine 410 updates the edge weights in the page graph 160 based on these importance factors. As shown, the graph update engine 410 may include one or more update rules 412 indicating how to update the graph 160 based on the importance factors. In this example, each edge weight is "scaled" by multiplying its current value by a corresponding multiplier determined based on the corresponding importance value. For example, a set of weight adjustment rules 414 may indicate that an edge weight is multiplied by 1.5 if the edge's importance value is determined to be between 0.5 and 1.0 inclusive; otherwise, the edge weight is to be multiplied by 1.0 if the edge's importance value is determined to be greater than 0.25; and otherwise, the edge weight is to be multiplied by 0.25 if the edge's importance value is determined to be between 0 and 0.25. This example configuration allows node-to-node patterns that are observed heavily to be "boosted" in importance (e.g., via the 1.5 scaling) while patterns that are only lightly seen to be decreased in importance.

For example, the edge between nodes 1 and 2 previously had a weight of 50, and as its importance value for that edge is 0.17, the weight is scaled by 0.25×, resulting in the new edge weight of 12.5. This occurs for all edges, e.g., the edge between nodes 2 and 6 is scaled from 100 to 150 as a result of the importance factor being 0.98, and according to the weight adjustment rules 414 the original weight (100) is to be scaled by 1.5×. Further, in this example the edge between nodes 3 and 6 was not observed in the pattern store 154 and thus has an importance factor of 0; thus, according to the weight adjustment rules 414 the original weight (5) is to be scaled by 0.25×, leading to the new weight being 1.25.

In some examples, a set of post adjustment rules 416 is utilized to post-process the adjusted weights and/or to modify the graph accordingly. In this example, a first rule (here, represented as "MAX(100)") indicates that the maximum possible weight is to be 100, so if any new edge weight is larger than that, it is to be reduced to 100. As shown, this cases various edge weights to be rounded down—e.g., edges between nodes 2-6, 6-7, and 7-8. A second example rule of the post adjustment rules 416 ("PRUNE IF<5") specifies that an edge is to be removed if its new weight is less than 5—here, the edge between 3-6 has been updated to 1.25, and thus the edge is removed. In some examples, a check is made by the graph update engine 410 to determine if this removal has resulted in any nodes that are no longer connected to the graph (e.g., it no longer has any associated edges), and if so, those nodes may be removed. In some cases, this can cause a graph to be split into two (or more) graphs, which can be allowed in some examples. In some examples, various update rules 412 may be configured by the operator of the provider network or database provider, and/or may be configured by a user associated with the database (e.g., an owner or administrator of the database).

In some examples, the graph can be stored in a key-value store that is optimized for fast lookups, such as via including storing an identifier of a node as a key, together with a set of edges (and optionally weights) as the corresponding value. Thus, query processors can perform lookups extremely quickly, and the comparatively more intensive write operations can be reserved for periodic updates as described herein.

Figure 5:
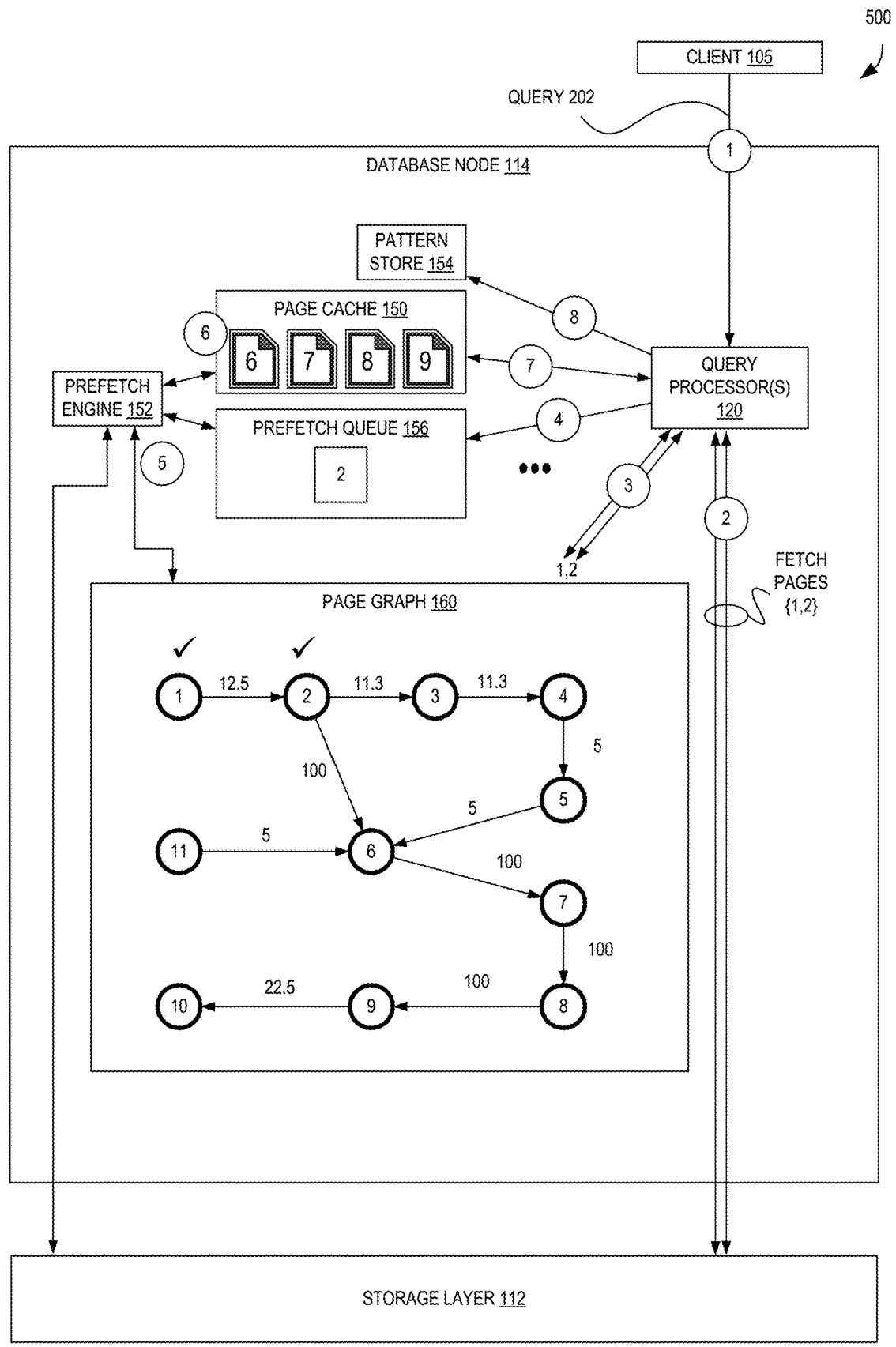
FIG. 5 illustrates operations of components of an exemplary system performing query processing and intelligent database page prefetching according to some examples.

FIG. 5 illustrates operations of components of an exemplary system 500 performing query processing and intelligent database page prefetching according to some examples. This illustrated example shows how updated page graph 160 updated with regard to FIG. 4 can be used for page prefetching. For example, a query 202 is sent from a client 105 at circle (1) and received at the database node 114 and provided to a query processor 120 which begins to process the query 202, e.g., by identifying pages storing data that it will need. In this example, the query processor 120 determines that it first needs page "1", which it determines is not in the page cache 150 and sends a request at circle (2) to fetch page "1" while at circle (3) noting that page "1" is in the page graph 160. The query processor 120 may thus, in some examples, keep track of a pattern length value (of "1", indicating that it has requested one consecutive page that is on a valid path in the graph 160) and a pointer to the last node it has matched-here, node "1." The query processor 120 may also determine that the matched pattern length value (of "1") is less than a prefetch threshold configured for the system, e.g., of length "2."

This same process may continue for page "2", where at circle (2) the page is fetched from the storage layer 112 and the graph iterated one node at a time, e.g., by moving to node "2" (updating the pattern length value to 2 and the pointer to node 2, and determining that the pattern length value of 2 is no longer less than the prefetch threshold value of "2," and the query processor 120 in response may, at circle (4), cause a value (e.g., an identifier of the last matched node in the graph, here represented as "2") to be inserted into the prefetch queue 156.

In response, the prefetch engine 152 (e.g., a thread or process, possibly of multiple such threads or processes performing similar functionality) may obtain this value from the queue 156 at circle (5) and use it to identify a set of nodes to prefetch based on an analysis of the page graph 160. For example, the analysis may include selecting some number of pages to be prefetched (e.g., four pages), which may be a value that is configured/static by the database service or the user, or dynamically identified based on an operational condition, e.g., an amount of free space or available locations in the page cache 150, or even based on weights from the page graph 160 (e.g., by identifying all reachable nodes or consecutive nodes from the identified node having at least a particular weight).

In this example, we assume the prefetch engine 152 is configured to identify up to four pages to be prefetched. In this case, the prefetch engine 152 may determine that, starting at node "2" (corresponding to the identified page "2" from the prefetch queue 156), the next four nodes to be traversed could be nodes 6-7-8-9 or 3-4-5-6. In the case when only one path exists, the selection of nodes is straightforward. However, in this case, multiple paths exist and thus, given the task of identifying four nodes, the prefetch engine 152 may choose to select various different nodes. This selection may be based on the weights of the involved edges, e.g., weights of the edges between nodes 2-6 and 2-3. If one has a larger weight, that node could be selected, and thus it could be a configuration to follow a path of the graph where each "next hop" is selected based on the edge having a highest weight. That would result in pages 6-7-8-9 being prefetched, as is shown here. However, other approaches could be used, which may or may not require nodes being selected to lie on a single path-thus, perhaps each "next hop" is added to the list, and then the next hop of each of those nodes are added to the list, and so on. That could result in nodes 3 and 6 being first selected, and then nodes 4 and 7 being selected, and so no. This approach could increase the likelihood that the next-needed pages are in fact prefetched, at the expense of potentially being able to prefetch fewer nodes (in this first set of prefetches) that are ultimately needed. In other cases where the selection of nodes is governed by different constraints (or no constraints at all), the prefetch engine 152 could possibly select nodes from multiple paths, all reachable nodes, etc.

Accordingly, having identified nodes 6-7-8-9, the prefetch engine 152 can send requests to prefetch the database pages corresponding to these nodes from the storage layer 112 and then insert these pages into the page cache 150 at shown by circle (6).

The query processor 120 may then possibly determine it needs one or more of these pages, in which case it uses the pages direct from the page cache 150 at circle (7) instead of the much time-intensive task of sending requests to the storage layer 112 for these database pages. However, it could be the case that the prediction was wrong (e.g., page 23 is needed next-indicating a new pattern, or page 3 is needed next), in which case the query processor 120 may continue processing as described by fetching the page on its own, analyzing its traversal of the page graph 160 (starting back with a new pattern length value, should the desired page exist in the graph), etc., and eventually inserting another value in the prefetch queue 156 if warranted.

It is also possible the query processor 120 may utilize the prefetched database pages in the page cache 150 but then require additional pages. For example, upon needing page 10, the query processor 120 may again fetch it from the storage layer 112 and iterate the graph one more node (updating the pattern length value from 9 to 10 and the pointer from node 9 to node 10, and determining that the pattern length value of 10 is more than the prefetch threshold of 3, and causing another entry corresponding to database page 10 to be inserted in the prefetch queue 156 at circle (8). Upon completion of processing for the query, the query processor 120 may again place a record corresponding to the overall sequence/pattern of pages used for the query 202 into the pattern store 154, allowing for subsequent analysis and updating of the page graph 160.

Figure 6:
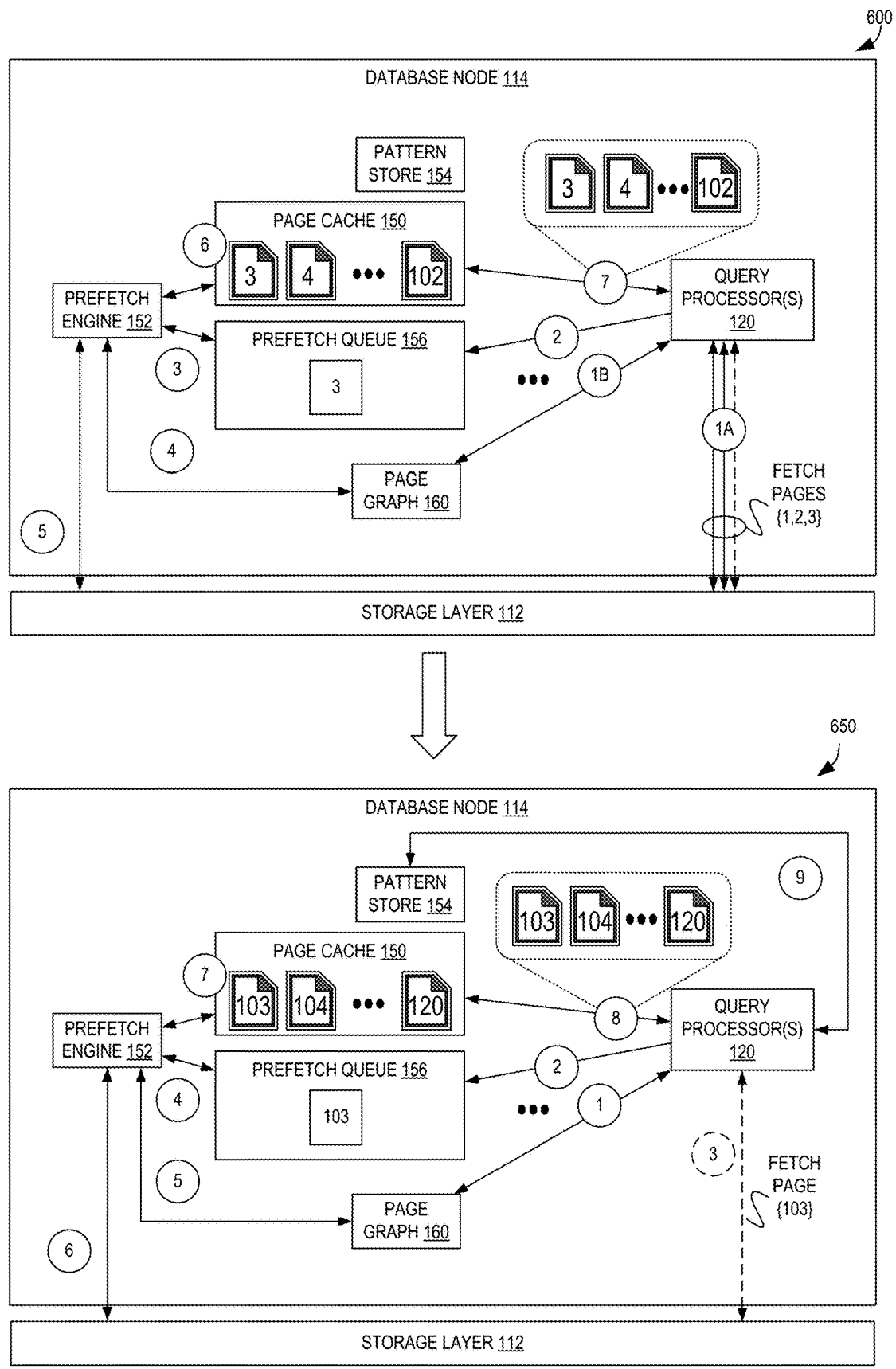
FIG. 6 illustrates repeated prefetching for a single query according to some examples.

FIG. 6 illustrates repeated prefetching for a single query according to some examples. At the top of this example indicated by arrow 600, the query processor 120 may be processing a query that requires a large number of database pages, e.g., 1-120. In this example, the query processor 120 may begin by for page 1 by determining that the page is not in the page cache 150, fetching the page at circle (1A), and traversing the page graph 160 to determine that the matched pattern length value is 1 (and keeping a pointer to the last traversed node) at circle (1B). These operations may also repeat for database pages 2 and 3, and at database page 3 we assume that a prefetch threshold of 3 is satisfied, leading to the query processor 120 inserting a record/entry into a prefetch queue 156 corresponding to database page 3 and/or node 3. In various examples, the query processor 120 may or may not fetch database page 3 on its own—for example, the insertion of the entry for page 3 into the prefetch queue 156 may cause the prefetch engine 152 to fetch the page, and thereafter the query processor 120 may simply wait to obtain it from the page cache 150.

In this example, the prefetch engine 152 detects and removes the entry for "3" from the prefetch queue 156 at circle (4), identifies pages to be prefetched via an analysis of the page graph 160 at circle (5), and prefetches a number of database pages at circle (6) to be inserted into the page cache 150 at circle (7). In this example, database pages 3 through 102 are prefetched. Thereafter, we assume that the query processor 120 pulls ones of these pages—and perhaps all—directly from the comparatively much-faster page cache 150 instead of retrieving these pages from the (often remote, network-attached) storage layer 112.

Upon needing a next database page (e.g., "103") after page "102", we turn to the bottom portion of the figure as indicated by arrow 650. Having determined that it requires database page 103, at circle (1), the query processor 120 may analyze the page graph 160 to determine that it is still on a stored sequence and that the matched pattern length value (e.g., "103") is much larger than the prefetch threshold (e.g., "3"), and thus at circle (2) inserts a record into the prefetch queue 156 for node "103." In some examples, the query processor 120 may directly fetch this page itself at dashed optional circle (3), though in others it may wait for the prefetch engine 152 to do it.

Thus, at circle (4) the prefetch engine 152 detects and removes the entry for "103" from the prefetch queue 156, identifies pages to be prefetched via an analysis of the page graph 160 at circle (5), and prefetches a number of database pages at circle (6) to be inserted into the page cache 150 at circle (7). In this example, database pages "103" through "120" are prefetched, which represents fewer pages than the last iteration, possibly due to reaching the end of a path through the page graph 160, or due to an amount of available space in the page cache 150 being comparatively less, etc. Thus, at circle (8) the query processor 120 may continue processing via use of the fetched pages 103-120 via the local page cache 150. At circle (9), the query processor 120 completes the process by inserting an indicator of the complete sequence/pattern into the pattern store 154, and (not shown) returns results of the processing to the requesting client.

Figure 7:
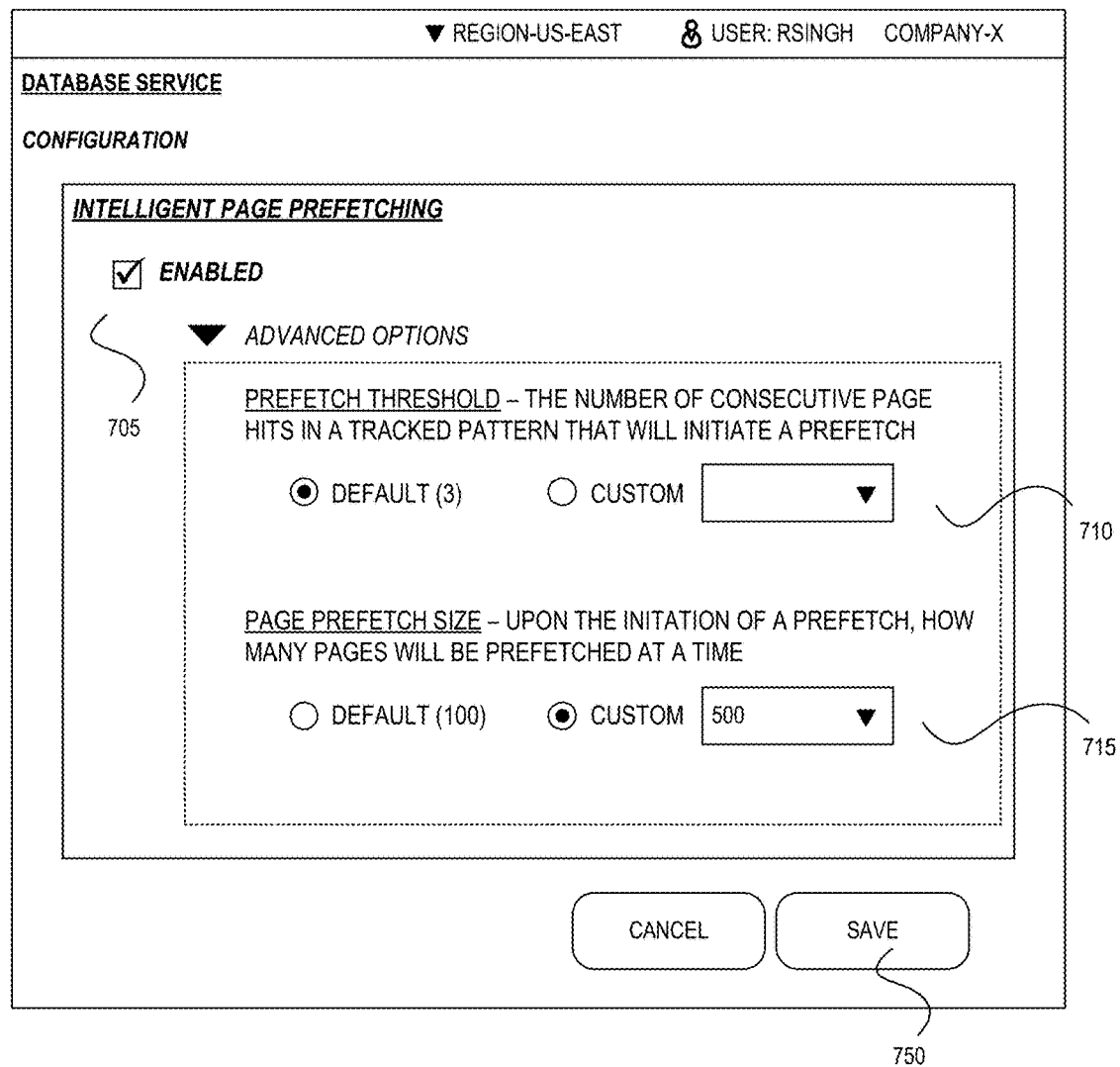
FIG. 7 illustrates an exemplary user interface for user-configurable intelligent page prefetching according to some examples.

As indicated herein, in some examples the particular users of a database service providing intelligent database pages prefetching can provide configuration information to customize how a database service performs the prefetching, allowing for the service to be customized for the particular user's application. FIG. 7 illustrates an exemplary user interface 700 for user-configurable intelligent page prefetching according to some examples. A user may utilize a console (e.g., a web-based application) or other application providing a user interface 700 to configure services provided by a service provider network or database service provider. In this example, the user may be presented a user interface 700 allowing the user to specify whether intelligent page prefetching is to be enabled or not enabled (for a particular database, for the user's account as a whole, etc.) via user input element 705, which here is a checkbox but could be other types of well-known user interface input elements such as radio boxes, buttons, sliders, text input boxes, sliders, drop-down box, etc.

The user interface 700 shown also includes additional customization options, e.g., a set of user input elements 710 allowing the user to specify the pattern length threshold-here, a radio button allowing for selection between a default value (system provided, here "3") or a custom user-specified value (e.g., one, two, five, ten, or even a user-inputted value, etc.), which could be selected using a drop-down box user input element.

The user interface 700 also includes a set of user input elements 715 allowing the user to specify a page prefetch size value that indicates how many pages should optimally be prefetched at a time. Here, the user input elements 715 include a radio button allowing for selection between a default value (system provided, here "100") or a custom user-specified value (e.g., ten, fifty, five-hundred, one thousand, or even a user-inputted value, etc.), which could be selected using a drop-down box user input element.

Upon the user indicating a desire to save the configuration via user input element 750 (here, illustrated as a button), the database service can configure the user's database accordingly, and thus a pattern match length of 3 would cause up to five-hundred pages to be prefetched, if possible.

Figure 8:
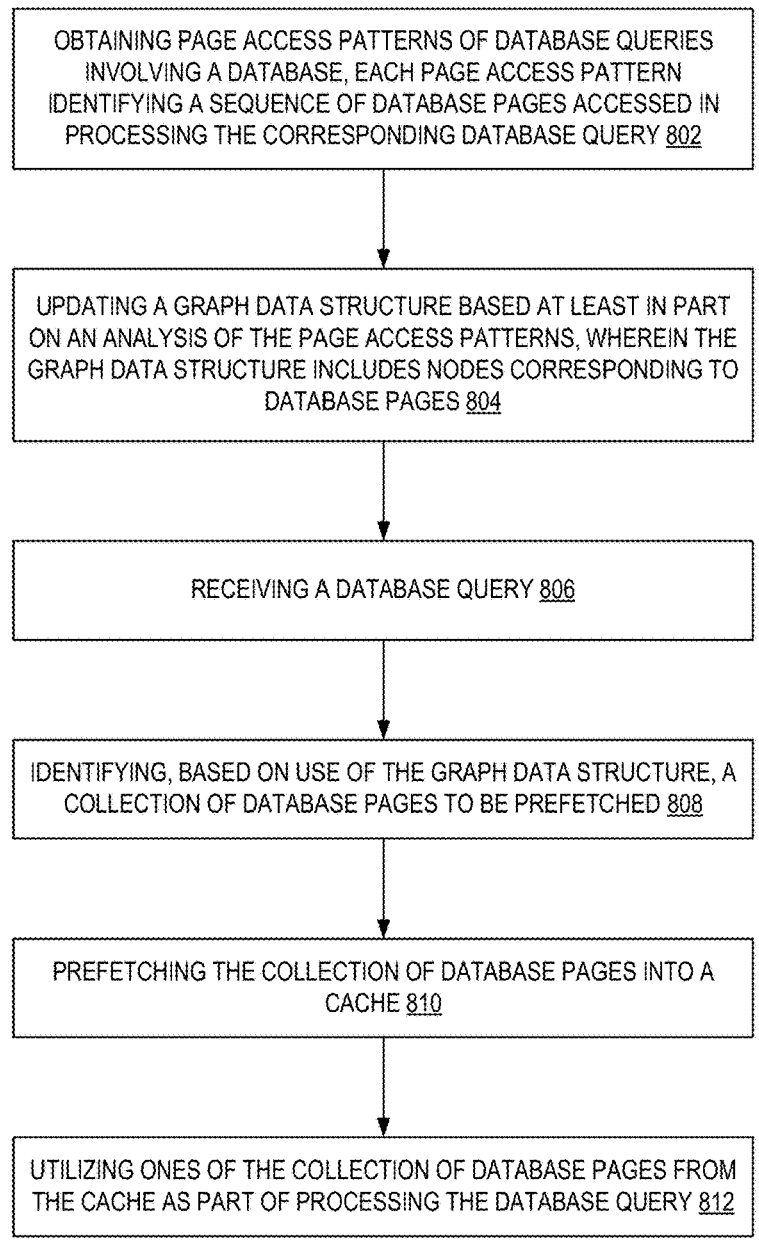
FIG. 8 is a flow diagram illustrating operations of a method for query processing utilizing intelligently prefetched database pages according to some examples.

FIG. 8 is a flow diagram illustrating operations '200 of a method for query processing utilizing intelligently prefetched database pages according to some examples. Some or all of the operations 800 (or other processes described herein, or variations, and/or combinations thereof) are performed under the control of one or more computer systems configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some examples, one or more (or all) of the operations 800 are performed by one or more database nodes 114 of the other figures.

The operations 800 include, at block 802, obtaining page access patterns of database queries involving a database, each page access pattern identifying a sequence of database pages accessed in processing the corresponding database query.

The operations 800 further include, at block 804, updating a graph data structure based at least in part on an analysis of the page access patterns, wherein the graph data structure includes nodes corresponding to database pages.

In some examples, updating the graph data structure based at least in part on the analysis of the page access patterns includes identifying one or more page access sequences that are common across multiple database queries.

The operations 800 further include, at block 806, receiving a database query.

In some examples, the operations 800 further include determining that a first database page is needed as part of processing the database query; determining that a first node in the graph data structure exists that corresponds to the first database page; and determining to fetch the first database page separate from the prefetching.

In some examples, the operations 800 further include determining that a second database page is needed as part of processing the database query; determining that a second node in the graph data structure exists that corresponds to the second database page and that is connected to the first node via an edge; determining that a prefetch threshold is satisfied; and inserting an entry into a prefetch data structure, wherein the identifying of the collection of database pages to be prefetched occurs based at least in part on the existence of the entry. In some examples, the entry identifies a node in the graph data structure that corresponds to a most-recently accessed database page, or a next-to-be-accessed database page, for processing the database query.

The operations 800 include, at block 808, identifying, based on use of the graph data structure, a collection of database pages to be prefetched.

In some examples, identifying the collection of database pages to be prefetched occurs responsive to determining that a prefetch threshold number of nodes in a path, represented in the graph data structure, have been accessed via corresponding to database pages needed as part of processing the database query. In some examples, the identified collection of database pages correspond to ones of the nodes of the graph data structure that are in a same path as one or more nodes already accessed due to their correspondence with database pages utilized as part of processing the database query.

In some examples, the identifying of the collection of database pages to be prefetched is based at least in part of an analysis of one or more edge weights associated with edges in the graph data structure. In some examples, the operations 800 further include updating edge weights of the graph data structure to reduce the likelihood of particular database pages from being identified for prefetching.

The operations 800 further include, at block 810, prefetching the collection of database pages into a cache.

The operations 800 further include, at block 812, utilizing ones of the collection of database pages from the cache as part of processing the database query.

In some examples, the obtaining, updating, receiving, identifying, prefetching, and utilizing are performed by one or more database nodes in a processing layer of a database service of a service provider network; and the database pages are stored by page storage nodes in a distributed storage layer of the database service.

In some examples, the operations 800 further include receiving user-specified configuration data associated with the database, wherein the user-specified configuration data specifies at least one of: an indication of whether prefetching is to be enabled for the database; an indication of a prefetch threshold value that indicates when prefetching is to occur; and an indication of a database page prefetch size indicating a number of database pages or a size of database pages to be prefetched at a time.

In some examples, the operations 800 further include determining a prefetch effectiveness score indicative of an amount of prefetched pages, over a period of time, from the cache that were actually used to process database queries; and based at least in part on the prefetch effectiveness score (e.g., based on determining that the prefetch effectiveness score is below a threshold), adjusting a number of database pages (e.g., reducing the number) to be prefetched for a next prefetch operation. In other examples, the number may be adjusted larger based on determining that the prefetch effectiveness score is above a threshold number.

Figure 9:
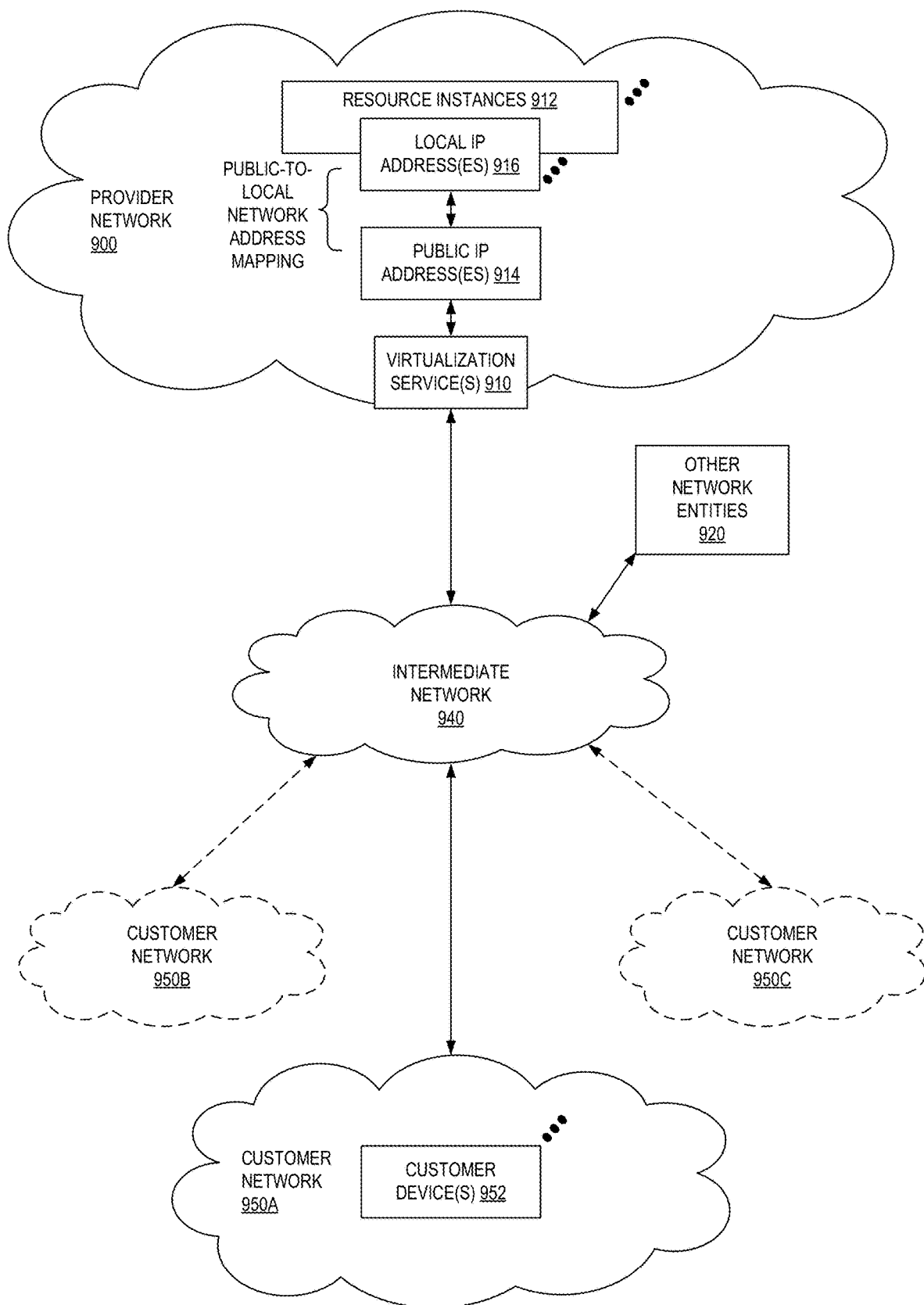
FIG. 9 illustrates an example provider network environment according to some examples.

FIG. 9 illustrates an example provider network (or "service provider system") environment according to some examples. A provider network 900 can provide resource virtualization to customers via one or more virtualization services 910 that allow customers to purchase, rent, or otherwise obtain instances 912 of virtualized resources, including but not limited to computation and storage resources, implemented on devices within the provider network or networks in one or more data centers. Local Internet Protocol (IP) addresses 916 can be associated with the resource instances 912; the local IP addresses are the internal network addresses of the resource instances 912 on the provider network 900. In some examples, the provider network 900 can also provide public IP addresses 914 and/or public IP address ranges (e.g., Internet Protocol version 4 (IPv4) or Internet Protocol version 6 (IPv6) addresses) that customers can obtain from the provider 900.

Conventionally, the provider network 900, via the virtualization services 910, can allow a customer of the service provider (e.g., a customer that operates one or more customer networks 950A-950C (or "client networks") including one or more customer device(s) 952) to dynamically associate at least some public IP addresses 914 assigned or allocated to the customer with particular resource instances 912 assigned to the customer. The provider network 900 can also allow the customer to remap a public IP address 914, previously mapped to one virtualized computing resource instance 912 allocated to the customer, to another virtualized computing resource instance 912 that is also allocated to the customer. Using the virtualized computing resource instances 912 and public IP addresses 914 provided by the service provider, a customer of the service provider such as the operator of the customer network(s) 950A-950C can, for example, implement customer-specific applications and present the customer's applications on an intermediate network 940, such as the Internet. Other network entities 920 on the intermediate network 940 can then generate traffic to a destination public IP address 914 published by the customer network(s) 950A-950C; the traffic is routed to the service provider data center, and at the data center is routed, via a network substrate, to the local IP address 916 of the virtualized computing resource instance 912 currently mapped to the destination public IP address 914. Similarly, response traffic from the virtualized computing resource instance 912 can be routed via the network substrate back onto the intermediate network 940 to the source entity 920.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and can be mutable within the provider network. Network traffic originating outside the provider network is not directly routed to local IP addresses; instead, the traffic uses public IP addresses that are mapped to the local IP addresses of the resource instances. The provider network can include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses can be assigned by the provider network infrastructure to particular resource instances; these public IP addresses can be referred to as standard public IP addresses, or simply standard IP addresses. In some examples, the mapping of a standard IP address to a local IP address of a resource instance is the default launch configuration for all resource instance types.

At least some public IP addresses can be allocated to or obtained by customers of the provider network 900; a customer can then assign their allocated public IP addresses to particular resource instances allocated to the customer. These public IP addresses can be referred to as customer public IP addresses, or simply customer IP addresses. Instead of being assigned by the provider network 900 to resource instances as in the case of standard IP addresses, customer IP addresses can be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 10:
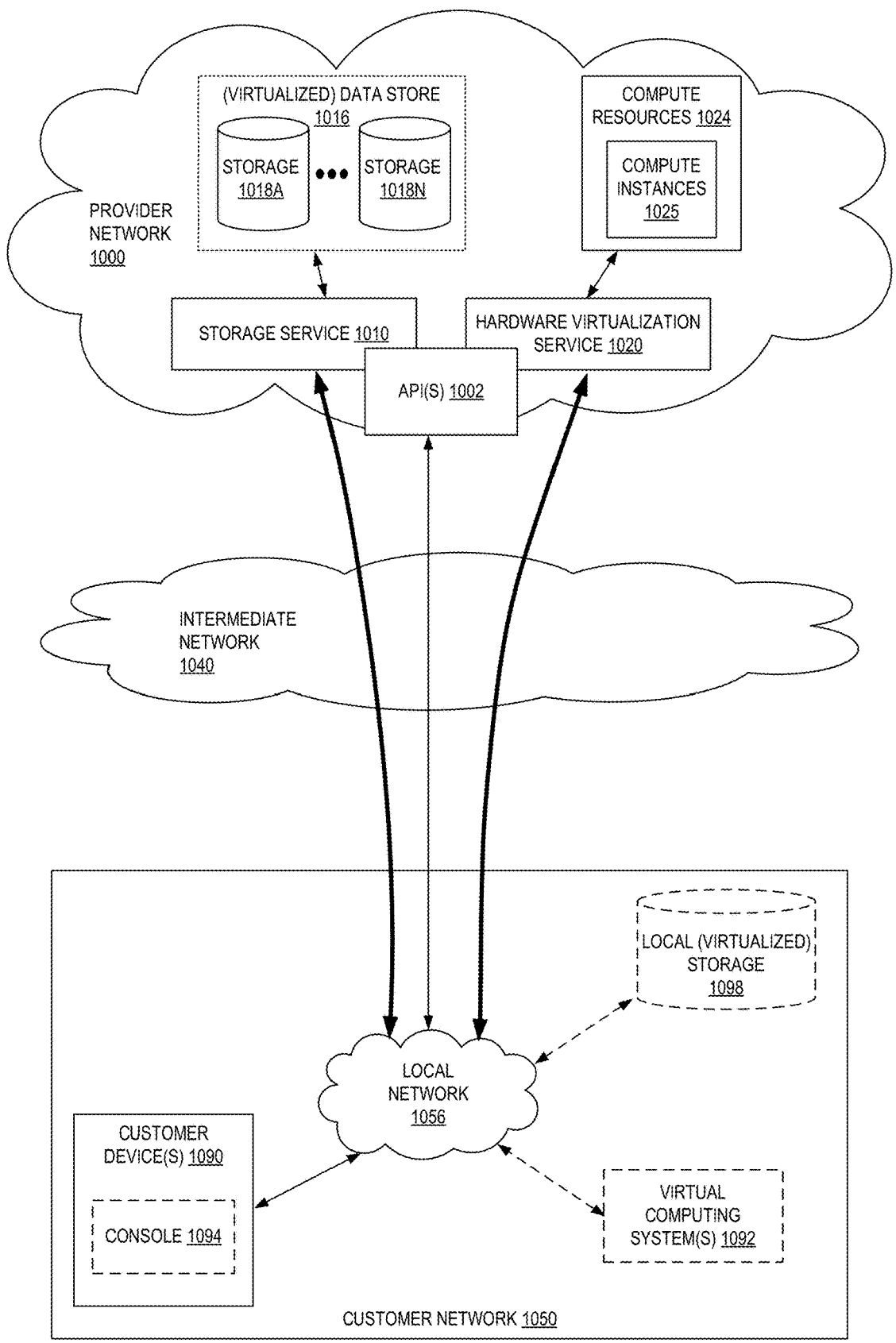
FIG. 10 is a block diagram of an example provider network that provides a storage service and a hardware virtualization service to customers according to some examples.

FIG. 10 is a block diagram of an example provider network environment that provides a storage service and a hardware virtualization service to customers, according to some examples. A hardware virtualization service 1020 provides multiple compute resources 1024 (e.g., compute instances 1025, such as VMs) to customers. The compute resources 1024 can, for example, be provided as a service to customers of a provider network 1000 (e.g., to a customer that implements a customer network 1050). Each computation resource 1024 can be provided with one or more local IP addresses. The provider network 1000 can be configured to route packets from the local IP addresses of the compute resources 1024 to public Internet destinations, and from public Internet sources to the local IP addresses of the compute resources 1024.

The provider network 1000 can provide the customer network 1050, for example coupled to an intermediate network 1040 via a local network 1056, the ability to implement virtual computing systems 1092 via the hardware virtualization service 1020 coupled to the intermediate network 1040 and to the provider network 1000. In some examples, the hardware virtualization service 1020 can provide one or more APIs 1002, for example a web services interface, via which the customer network 1050 can access functionality provided by the hardware virtualization service 1020, for example via a console 1094 (e.g., a web-based application, standalone application, mobile application, etc.) of a customer device 1090. In some examples, at the provider network 1000, each virtual computing system 1092 at the customer network 1050 can correspond to a computation resource 1024 that is leased, rented, or otherwise provided to the customer network 1050.

From an instance of the virtual computing system(s) 1092 and/or another customer device 1090 (e.g., via console 1094), the customer can access the functionality of a storage service 1010, for example via the one or more APIs 1002, to access data from and store data to storage resources 1018A-1018N of a virtual data store 1016 (e.g., a folder or "bucket," a virtualized volume, a database, etc.) provided by the provider network 1000. In some examples, a virtualized data store gateway (not shown) can be provided at the customer network 1050 that can locally cache at least some data, for example frequently accessed or critical data, and that can communicate with the storage service 1010 via one or more communications channels to upload new or modified data from a local cache so that the primary store of data (the virtualized data store 1016) is maintained. In some examples, a user, via the virtual computing system 1092 and/or another customer device 1090, can mount and access virtual data store 1016 volumes via the storage service 1010 acting as a storage virtualization service, and these volumes can appear to the user as local (virtualized) storage 1098.

While not shown in FIG. 10, the virtualization service(s) can also be accessed from resource instances within the provider network 1000 via the API(s) 1002. For example, a customer, appliance service provider, or other entity can access a virtualization service from within a respective virtual network on the provider network 1000 via the API(s) 1002 to request allocation of one or more resource instances within the virtual network or within another virtual network.

Illustrative Systems

Figure 11:
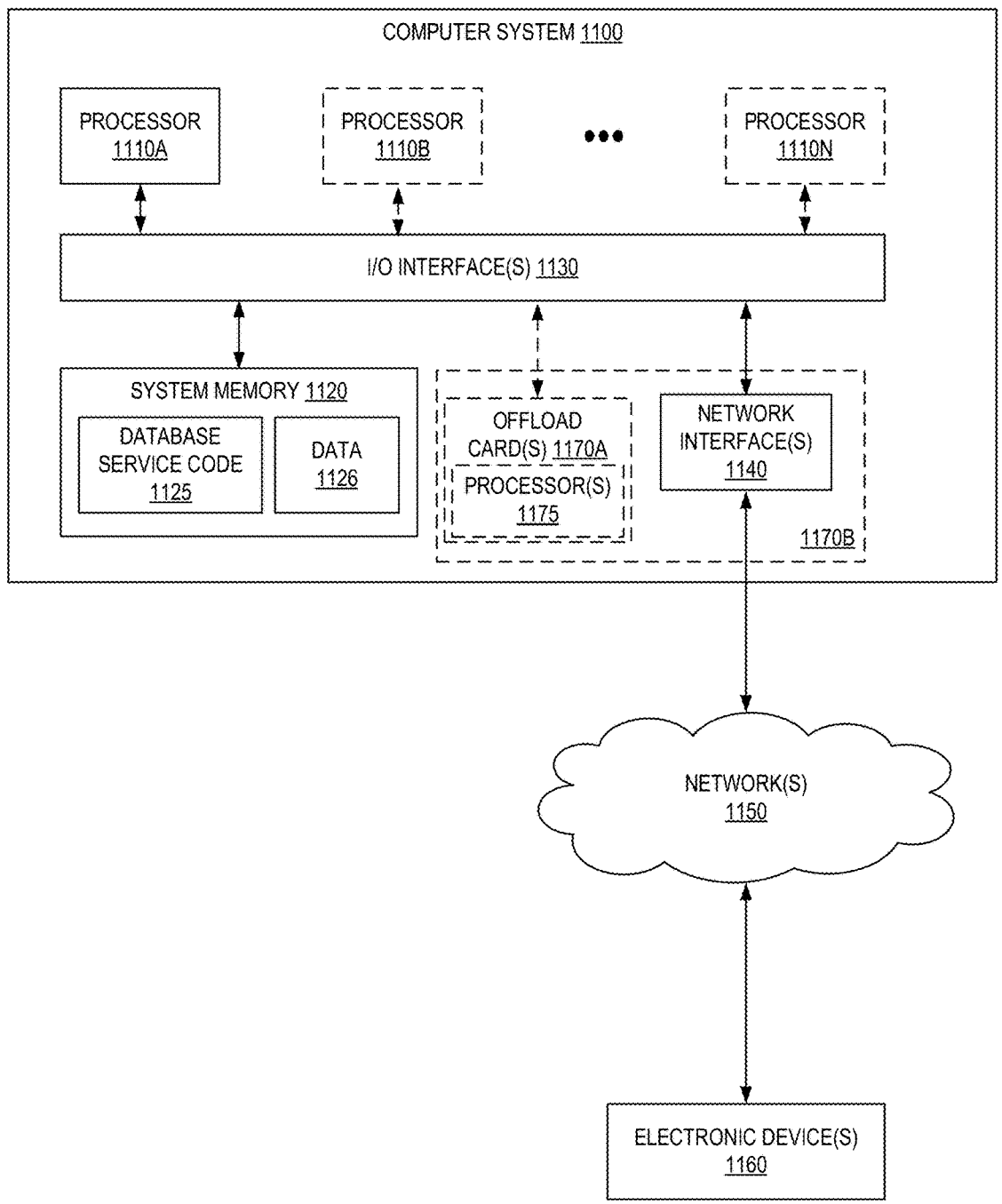
FIG. 11 is a block diagram illustrating an example computer system that can be used in some examples.

In some examples, a system that implements a portion or all of the techniques described herein can include a general-purpose computer system, such as the computer system 1100 illustrated in FIG. 11, that includes, or is configured to access, one or more computer-accessible media. In the illustrated example, the computer system 1100 includes one or more processors 1110 coupled to a system memory 1120 via an input/output (I/O) interface 1130. The computer system 1100 further includes a network interface 1140 coupled to the I/O interface 1130. While FIG. 11 shows the computer system 1100 as a single computing device, in various examples the computer system 1100 can include one computing device or any number of computing devices configured to work together as a single computer system 1100.

In various examples, the computer system 1100 can be a uniprocessor system including one processor 1110, or a multiprocessor system including several processors 1110 (e.g., two, four, eight, or another suitable number). The processor(s) 1110 can be any suitable processor(s) capable of executing instructions. For example, in various examples, the processor(s) 1110 can be general-purpose or embedded processors implementing any of a variety of instruction set architectures (ISAs), such as the x86, ARM, PowerPC, SPARC, or MIPS ISAs, or any other suitable ISA. In multiprocessor systems, each of the processors 1110 can commonly, but not necessarily, implement the same ISA.

The system memory 1120 can store instructions and data accessible by the processor(s) 1110. In various examples, the system memory 1120 can be implemented using any suitable memory technology, such as random-access memory (RAM), static RAM (SRAM), synchronous dynamic RAM (SDRAM), nonvolatile/Flash-type memory, or any other type of memory. In the illustrated example, program instructions and data implementing one or more desired functions, such as those methods, techniques, and data described above, are shown stored within the system memory 1120 as database service code 1125 (e.g., executable to implement, in whole or in part, the database service 110) and data 1126.

In some examples, the I/O interface 1130 can be configured to coordinate I/O traffic between the processor 1110, the system memory 1120, and any peripheral devices in the device, including the network interface 1140 and/or other peripheral interfaces (not shown). In some examples, the I/O interface 1130 can perform any necessary protocol, timing, or other data transformations to convert data signals from one component (e.g., the system memory 1120) into a format suitable for use by another component (e.g., the processor 1110). In some examples, the I/O interface 1130 can include support for devices attached through various types of peripheral buses, such as a variant of the Peripheral Component Interconnect (PCI) bus standard or the Universal Serial Bus (USB) standard, for example. In some examples, the function of the I/O interface 1130 can be split into two or more separate components, such as a north bridge and a south bridge, for example. Also, in some examples, some or all of the functionality of the I/O interface 1130, such as an interface to the system memory 1120, can be incorporated directly into the processor 1110.

The network interface 1140 can be configured to allow data to be exchanged between the computer system 1100 and other devices 1160 attached to a network or networks 1150, such as other computer systems or devices as illustrated in FIG. 1, for example. In various examples, the network interface 1140 can support communication via any suitable wired or wireless general data networks, such as types of Ethernet network, for example. Additionally, the network interface 1140 can support communication via telecommunications/telephony networks, such as analog voice networks or digital fiber communications networks, via storage area networks (SANs), such as Fibre Channel SANs, and/or via any other suitable type of network and/or protocol.

In some examples, the computer system 1100 includes one or more offload cards 1170A or 1170B (including one or more processors 1175, and possibly including the one or more network interfaces 1140) that are connected using the I/O interface 1130 (e.g., a bus implementing a version of the Peripheral Component Interconnect-Express (PCI-E) standard, or another interconnect such as a QuickPath interconnect (QPI) or UltraPath interconnect (UPI)). For example, in some examples the computer system 1100 can act as a host electronic device (e.g., operating as part of a hardware virtualization service) that hosts compute resources such as compute instances, and the one or more offload cards 1170A or 1170B execute a virtualization manager that can manage compute instances that execute on the host electronic device. As an example, in some examples the offload card(s) 1170A or 1170B can perform compute instance management operations, such as pausing and/or un-pausing compute instances, launching and/or terminating compute instances, performing memory transfer/copying operations, etc. These management operations can, in some examples, be performed by the offload card(s) 1170A or 1170B in coordination with a hypervisor (e.g., upon a request from a hypervisor) that is executed by the other processors 1110A-1110N of the computer system 1100. However, in some examples the virtualization manager implemented by the offload card(s) 1170A or 1170B can accommodate requests from other entities (e.g., from compute instances themselves), and can not coordinate with (or service) any separate hypervisor.

In some examples, the system memory 1120 can be one example of a computer-accessible medium configured to store program instructions and data as described above. However, in other examples, program instructions and/or data can be received, sent, or stored upon different types of computer-accessible media. Generally speaking, a computer-accessible medium can include any non-transitory storage media or memory media such as magnetic or optical media, e.g., disk or DVD/CD coupled to the computer system 1100 via the I/O interface 1130. A non-transitory computer-accessible storage medium can also include any volatile or non-volatile media such as RAM (e.g., SDRAM, double data rate (DDR) SDRAM, SRAM, etc.), read only memory (ROM), etc., that can be included in some examples of the computer system 1100 as the system memory 1120 or another type of memory. Further, a computer-accessible medium can include transmission media or signals such as electrical, electromagnetic, or digital signals, conveyed via a communication medium such as a network and/or a wireless link, such as can be implemented via the network interface 1140.

Various examples discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most examples use at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In examples using a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also can be capable of executing programs or scripts in response requests from user devices, such as by executing one or more Web applications that can be implemented as one or more scripts or programs written in any programming language, such as Java®, C, C# or C++, or any scripting language, such as Perl, Python, PHP, or TCL, as well as combinations thereof. The server(s) can also include database servers, including without limitation those commercially available from Oracle (R), Microsoft (R), Sybase (R), IBM (R), etc. The database servers can be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of examples, the information can reside in a storage-area network (SAN) familiar to those skilled in the art. Similarly, any necessary files for performing the functions attributed to the computers, servers, or other network devices can be stored locally and/or remotely, as appropriate. Where a system includes computerized devices, each such device can include hardware elements that can be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system can also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate examples can have numerous variations from that described above. For example, customized hardware might also be used and/or particular elements might be implemented in hardware, software (including portable software, such as applets), or both. Further, connection to other computing devices such as network input/output devices can be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various examples.

In the preceding description, various examples are described. For purposes of explanation, specific configurations and details are set forth in order to provide a thorough understanding of the examples. However, it will also be apparent to one skilled in the art that the examples can be practiced without the specific details. Furthermore, well-known features can be omitted or simplified in order not to obscure the example being described.

Bracketed text and blocks with dashed borders (e.g., large dashes, small dashes, dot-dash, and dots) are used herein to illustrate optional aspects that add additional features to some examples. However, such notation should not be taken to mean that these are the only options or optional operations, and/or that blocks with solid borders are not optional in certain examples.

Reference numerals with suffix letters (e.g., 1018A-1018N) can be used to indicate that there can be one or multiple instances of the referenced entity in various examples, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters might or might not have the same number of instances in various examples.

References to "one example," "an example," etc., indicate that the example described can include a particular feature, structure, or characteristic, but every example can not necessarily include the particular feature, structure, or characteristic. Moreover, such phrases are not necessarily referring to the same example. Further, when a particular feature, structure, or characteristic is described in connection with an example, it is submitted that it is within the knowledge of one skilled in the art to affect such feature, structure, or characteristic in connection with other examples whether or not explicitly described.

Moreover, in the various examples described above, unless specifically noted otherwise, disjunctive language such as the phrase "at least one of A, B, or C" is intended to be understood to mean either A, B, or C, or any combination thereof (e.g., A, B, and/or C). Similarly, language such as "at least one or more of A, B, and C" (or "one or more of A, B, and C") is intended to be understood to mean A, B, or C, or any combination thereof (e.g., A, B, and/or C). As such, disjunctive language is not intended to, nor should it be understood to, imply that a given example requires at least one of A, at least one of B, and at least one of C to each be present.

As used herein, the term "based on" (or similar) is an open-ended term used to describe one or more factors that affect a determination or other action. It is to be understood that this term does not foreclose additional factors that may affect a determination or action. For example, a determination may be solely based on the factor(s) listed or based on the factor(s) and one or more additional factors. Thus, if an action A is "based on" B, it is to be understood that B is one factor that affects action A, but this does not foreclose the action from also being based on one or multiple other factors, such as factor C. However, in some instances, action A may be based entirely on B.

Unless explicitly stated, articles such as "a" or "an" should generally be interpreted to include one or multiple described items. Accordingly, phrases such as "a device configured to" or "a computing device" are intended to include one or multiple recited devices. Such one or more recited devices can be collectively configured to carry out the stated operations. For example, "a processor configured to carry out operations A, B, and C" can include a first processor configured to carry out operation A working in conjunction with a second processor configured to carry out operations B and C.

Further, the words "may" or "can" are used in a permissive sense (i.e., meaning having the potential to), rather than the mandatory sense (i.e., meaning must). The words "include," "including," and "includes" are used to indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for the nouns that they precede, and do not imply any type of ordering (e.g., spatial, temporal, logical, etc.) unless such an ordering is otherwise explicitly indicated.

The specification and drawings are, accordingly, to be regarded in an illustrative rather than a restrictive sense. It will, however, be evident that various modifications and changes can be made thereunto without departing from the broader scope of the disclosure as set forth in the claims.

What is claimed is:

1. A computer-implemented method comprising:
    processing, by a processing layer of a database service of a service provider network, database queries;
    writing page access patterns for the database queries to a data structure, wherein each page access pattern of the page access patterns identifies a sequence of database pages accessed in processing a corresponding database query of the database queries;
    performing an analysis of the page access patterns to identify one or more patterns, wherein the patterns comprise sequences or subsequences of database page accesses;
    updating a graph data structure based at least in part on the identified one or more patterns, wherein the graph data structure includes nodes corresponding to database pages and edges having weights;
    in response to receiving a database query:
        determining a path in the graph data structure corresponding to a sequence of database pages accessed as part of processing the database query;
        identifying, based on the path in the graph data structure, a collection of database pages to be prefetched, wherein identifying, based on the path in the graph data structure, the collection of database pages to be prefetched is based on identifying nodes in the graph data structure that are successive to a node in the graph data structure corresponding to a database page of the sequence of database pages that was accessed as part of processing the database query;
        prefetching the collection of database pages into a computer memory cache;
        utilizing ones of the collection of database pages from the computer memory cache as part of processing the database query to yield a query result; and
        transmitting the query result.

2. The computer-implemented method of claim 1, wherein updating the graph data structure includes updating ones of the weights, and wherein the identifying of the collection of database pages to be prefetched is based at least in part on one or more of the weights.

3. The computer-implemented method of claim 1, wherein access to the graph data structure is controlled via use of a read-copy-update locking mechanism.

4. A computer-implemented method comprising:
- obtaining page access patterns of database queries involving a database, each page access pattern of the page access patterns identifying a sequence of database pages accessed in processing a corresponding database query of the database queries;
- updating a graph data structure based at least in part on an analysis of the page access patterns, wherein the graph data structure includes nodes corresponding to database pages;
- after receiving a database query:
  - determining a path in the graph data structure corresponding to a sequence of database pages accessed as part of processing the database query;
  - identifying, based on use of the path in the graph data structure, a collection of database pages to be prefetched, wherein identifying, based on the path in the graph data structure, the collection of database pages to be prefetched is based on identifying nodes in the graph data structure that are successive to a node in the graph data structure corresponding to a database page of the sequence of database pages that was accessed as part of processing the database query;
  - prefetching the collection of database pages into a computer memory cache; and
  - utilizing ones of the collection of database pages from the computer memory cache as part of processing the database query.

5. The computer-implemented method of claim 4, further comprising:
- determining that a first database page is needed as part of processing the database query;
- determining that a first node in the graph data structure exists that corresponds to the first database page; and
- determining to fetch the first database page separate from the prefetching.

6. The computer-implemented method of claim 5, further comprising:
- determining that a second database page is needed as part of processing the database query;
- determining that a second node in the graph data structure exists that corresponds to the second database page and that is connected to the first node via an edge;
- determining that a prefetch threshold is satisfied; and
- inserting an entry into a prefetch data structure, wherein the identifying of the collection of database pages to be prefetched occurs based at least in part on the existence of the entry.

7. The computer-implemented method of claim 6, wherein the entry identifies a node in the graph data structure that corresponds to a most-recently accessed database page, or a next-to-be-accessed database page, for processing the database query.

8. The computer-implemented method of claim 4, wherein identifying the collection of database pages to be prefetched occurs responsive to determining that a prefetch threshold number of nodes in a path, represented in the graph data structure, have been accessed via corresponding to database pages needed as part of processing the database query.

9. The computer-implemented method of claim 8, wherein the identified collection of database pages correspond to ones of the nodes of the graph data structure that are in a same path as one or more nodes already accessed due to their correspondence with database pages utilized as part of processing the database query.

10. The computer-implemented method of claim 4, wherein updating the graph data structure based at least in part on the analysis of the page access patterns includes:
- identifying one or more page access sequences that are common across multiple database queries.

11. The computer-implemented method of claim 4, wherein the identifying of the collection of database pages to be prefetched is based at least in part of an analysis of one or more edge weights associated with edges in the graph data structure.

12. The computer-implemented method of claim 11, further comprising:
- updating edge weights of the graph data structure to reduce the likelihood of particular database pages from being identified for prefetching.

13. The computer-implemented method of claim 4, further comprising:
- determining a prefetch effectiveness score indicative of an amount of prefetched pages, over a period of time, from the computer memory cache that were actually used to process database queries; and
- based at least in part on the prefetch effectiveness score, adjusting a number of database pages to be prefetched for a next prefetch operation.

14. The computer-implemented method of claim 4, further comprising:
- receiving user-specified configuration data associated with the database, wherein the user-specified configuration data specifies at least one of:
  - an indication of whether prefetching is to be enabled for the database;
  - an indication of a prefetch threshold value that indicates when prefetching is to occur; and
  - an indication of a database page prefetch size indicating a number of database pages or a size of database pages to be prefetched at a time.

15. A system comprising:
- a processor; and
- a memory storing a set of instructions that when executed by the processor cause the system
- to implement a database node in a processing layer for a database service in a multi-tenant provider network, wherein the set of instructions include instructions that upon execution cause the database node to:
  - obtain page access patterns of database queries involving a database, each page access pattern of the page access patterns identifying a sequence of database pages accessed in processing a corresponding database query of the database queries;
  - update a graph data structure based at least in part on an analysis of the page access patterns, wherein the graph data structure includes nodes corresponding to database pages;
  - receive a database query;
  - determine, after receiving the database query, a path in the graph data structure corresponding to a sequence of database pages accessed as part of processing the database query;
  - identify, after receiving the database query and based on the path in the graph data structure, a collection of database pages to be prefetched based on an identification of nodes in the graph data structure that are successive to a node in the graph data structure corresponding to a database page of the sequence of database pages that was accessed as part of processing the database query;

prefetch, after receiving the database query, the collection of database pages, from a storage layer, into a computer memory cache local to the database node; and utilize, after receiving the database query, ones of the collection of database pages from the computer memory cache as part of processing the database query.

16. The system of claim 15, wherein the set of instructions further includes instructions that upon execution cause the database node to:

determine that a first database page is needed as part of processing the database query;

determine that a first node in the graph data structure exists that corresponds to the first database page; and determine to fetch the first database page separate from the prefetching.

17. The system of claim 16, wherein the set of instructions further includes instructions that upon execution cause the database node to:

determine that a second database page is needed as part of processing the database query;

determine that a second node in the graph data structure exists that corresponds to the second database page and that is connected to the first node via an edge;

determine that a prefetch threshold is satisfied; and insert an entry into a prefetch data structure, wherein the identifying of the collection of database pages to be prefetched occurs based at least in part on the existence of the entry.

18. The system of claim 17, wherein the entry identifies a node in the graph data structure that corresponds to a most-recently accessed database page, or a next-to-be-accessed database page, for processing the database query.

19. The system of claim 15, wherein the identification of the collection of database pages to be prefetched occurs responsive to a determination that a prefetch threshold number of nodes in a path, represented in the graph data structure, have been accessed via corresponding to database pages needed as part of processing the database query.

20. The system of claim 15, wherein the set of instructions further includes instructions that upon execution cause the database node to:

determine a prefetch effectiveness score indicative of an amount of prefetched pages, over a period of time, from the computer memory cache that were actually used to process database queries; and based at least in part on the prefetch effectiveness score, adjust a number of database pages to be prefetched for a next prefetch operation.

* * * * *